(12) United States Patent
Potyrailo et al.

(10) Patent No.: US 7,094,364 B2
(45) Date of Patent: Aug. 22, 2006

(54) METHOD OF AUTHENTICATING POLYMERS, AUTHENTICATABLE POLYMERS, METHODS OF MAKING AUTHENTICATABLE POLYMERS AND AUTHENTICATABLE ARTICLES, AND ARTICLES MADE THERE FROM

(75) Inventors: Radislav Potyrailo, Niskayuna, NY (US); Philippe Schottland, Evansville, IN (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/723,625

(22) Filed: Nov. 26, 2003

(65) Prior Publication Data

US 2005/0109984 A1    May 26, 2005

(51) Int. Cl.
G01N 31/02    (2006.01)
B32B 3/02     (2006.01)
B32B 27/00    (2006.01)

(52) U.S. Cl. .................. 252/408.1; 428/64.4; 428/412; 428/913; 428/916; 436/56

(58) Field of Classification Search .......... 428/1.1, 428/64.1, 172, 412, 913, 64.4, 916; 252/299.01, 252/408.1; 427/7, 8; 283/85; 436/56
See application file for complete search history.

(56) References Cited

U.S. PATENT DOCUMENTS

| | | | |
|---|---|---|---|
| 3,635,895 A | 1/1972 | Kramer | |
| 4,001,184 A | 1/1977 | Scoott | |
| 4,217,438 A | 8/1980 | Brunelle et al. | |
| 4,238,524 A | 12/1980 | LaLiberte et al. | ............. 427/7 |
| 4,304,899 A | 12/1981 | Mark et al. | ................. 528/171 |
| 4,699,510 A | 10/1987 | Alguard | |
| 4,813,973 A | 3/1989 | Winnik et al. | |
| 5,005,873 A | 4/1991 | West | ............................ 283/92 |
| 5,030,697 A | 7/1991 | Hugl et al. | |
| 5,118,349 A | 6/1992 | Jalon | |
| 5,128,419 A | 7/1992 | Fong et al. | |
| 5,137,364 A | 8/1992 | McCarthy | |
| 5,142,018 A | 8/1992 | Sakashita et al. | |

(Continued)

FOREIGN PATENT DOCUMENTS

DE    1011851    7/1957

(Continued)

OTHER PUBLICATIONS

M.G. Baron et al., Temperature Sensing Using Reversible Thermochromic Polymeric Films; Sensors And Actuators B 90 (2003) 271-275.

(Continued)

*Primary Examiner*—SHean C Wu

(57) ABSTRACT

In one embodiment, a method for authenticating that a test polymer is an authenticatable polymer is disclosed wherein the authenticatable polymer comprises a substrate polymer and a thermochromic compound, the thermochromic compound having a first signal at a first temperature and at an authenticating wavelength, and a second signal at an authenticating temperature and the authenticating wavelength, the first and second signals being different, and the authenticating temperature being greater than the first temperature, the method comprising subjecting the test polymer to a stimulus sufficient to raise a portion of the test polymer to the authenticating temperature to create a heated portion, determining a test signal of the heated portion of the test polymer at the authenticating wavelength, and authenticating that the test polymer is an authenticatable polymer if the test signal is the same as an authenticating signal of the authenticatable polymer.

34 Claims, 7 Drawing Sheets

U.S. PATENT DOCUMENTS

| | | | |
|---|---|---|---|
| 5,151,491 A | 9/1992 | Sakashita et al. | |
| 5,201,921 A | 4/1993 | Luttermann et al. | 8/506 |
| 5,314,072 A | 5/1994 | Frankel et al. | 209/44.1 |
| 5,326,692 A | 7/1994 | Brinkley et al. | |
| 5,329,127 A | 7/1994 | Becker et al. | 250/459.1 |
| 5,423,432 A | 6/1995 | Krutak et al. | 209/577 |
| 5,430,277 A | 7/1995 | Ohno et al. | |
| 5,461,136 A | 10/1995 | Krutak et al. | 528/289 |
| 5,510,619 A | 4/1996 | Zachmann et al. | 250/339.08 |
| 5,530,083 A | 6/1996 | Phelps et al. | |
| 5,553,714 A | 9/1996 | Cushman et al. | 209/577 |
| 5,573,909 A | 11/1996 | Singer et al. | |
| 5,616,674 A | 4/1997 | Michel et al. | |
| 5,648,197 A * | 7/1997 | Kuroda | 430/270.11 |
| 5,703,229 A | 12/1997 | Krutak et al. | 540/140 |
| 5,838,451 A | 11/1998 | McCarthy | 356/406 |
| 5,925,716 A | 7/1999 | Fu et al. | |
| 5,959,065 A | 9/1999 | Heuschen et al. | 528/198 |
| 5,966,456 A | 10/1999 | Jones et al. | |
| 6,001,953 A | 12/1999 | Davis et al. | 528/196 |
| 6,060,577 A | 5/2000 | Davis | 528/196 |
| 6,072,011 A | 6/2000 | Hoover | 525/464 |
| 6,091,563 A | 7/2000 | Thomas, III et al. | |
| 6,099,930 A | 8/2000 | Cyr et al. | 428/64.1 |
| 6,143,839 A | 11/2000 | Webb et al. | 525/439 |
| 6,160,787 A | 12/2000 | Marquardt, Jr. et al. | |
| 6,162,869 A | 12/2000 | Sharma et al. | 525/170 |
| 6,219,329 B1 | 4/2001 | Tanaka et al. | 369/275.1 |
| 6,251,680 B1 | 6/2001 | Fu et al. | |
| 6,296,911 B1 | 10/2001 | Catarineu Guillen | 428/29 |
| 6,297,508 B1 | 10/2001 | Barmore et al. | 250/459.1 |
| 6,355,420 B1 | 3/2002 | Chan | |
| 6,364,363 B1 * | 4/2002 | Stober et al. | 283/72 |
| 6,365,904 B1 | 4/2002 | Graves | |
| 6,380,547 B1 | 4/2002 | Gonzalez et al. | |
| 6,402,986 B1 | 6/2002 | Jones, II et al. | |
| 6,413,305 B1 * | 7/2002 | Mehta et al. | 106/31.41 |
| 6,475,588 B1 | 11/2002 | Schottland et al. | 428/64.1 |
| 6,475,589 B1 | 11/2002 | Pai-Paranjape et al. | 428/64.1 |
| 6,477,134 B1 | 11/2002 | Stebbings et al. | 369/272 |
| 6,514,617 B1 | 2/2003 | Hubbard et al. | 428/412 |
| 6,537,636 B1 | 3/2003 | Wisnudel et al. | 428/64.1 |
| 6,559,270 B1 | 5/2003 | Siclovan et al. | |
| 6,589,626 B1 | 7/2003 | Selinfreund et al. | 428/64.1 |
| 6,607,814 B1 | 8/2003 | Pickett et al. | 428/212 |
| 6,610,351 B1 * | 8/2003 | Shchegolikhin et al. | 427/7 |
| 6,638,593 B1 | 10/2003 | Selinfreund et al. | |
| 6,706,218 B1 * | 3/2004 | Lucht et al. | 252/408.1 |
| 6,707,539 B1 | 3/2004 | Selinfreund et al. | |
| 2002/0142236 A1 | 10/2002 | Iwasaki et al. | |
| 2002/0149003 A1 | 10/2002 | Lucht et al. | 252/408.1 |
| 2002/0191517 A1 * | 12/2002 | Honda et al. | 369/53.29 |
| 2003/0012562 A1 | 1/2003 | Lawandy et al. | |
| 2003/0021998 A1 | 1/2003 | Hubbard et al. | |
| 2003/0052305 A1 | 3/2003 | Coates et al. | |
| 2003/0152774 A1 | 8/2003 | Cradic et al. | 428/412 |
| 2003/0191952 A1 | 10/2003 | Anderson et al. | |
| 2005/0109983 A1 * | 5/2005 | Pai-Paranjape et al. | 252/299.01 |
| 2005/0110978 A1 * | 5/2005 | Potyrailo et al. | 356/71 |
| 2005/0111342 A1 | 5/2005 | Wisnudel et al. | |
| 2005/0112768 A1 * | 5/2005 | Evans et al. | 436/56 |

FOREIGN PATENT DOCUMENTS

| | | |
|---|---|---|
| DE | 102 48 870 A1 | 4/2004 |
| EP | 0 121 261 | 10/1984 |
| EP | 0 181 228 B1 | 7/1985 |
| EP | 0438225 A1 | 7/1991 |
| EP | 0 608 078 A1 | 1/1994 |
| EP | 0 625 766 B1 | 5/1994 |
| EP | 0 698 419 B1 | 6/1994 |
| EP | 0648798 A1 | 4/1995 |
| EP | 0438225 B1 | 10/1996 |
| EP | 1 220 165 A3 | 10/2001 |
| GB | 1 170 965 | 11/1969 |
| GB | 1 487 967 | 10/1977 |
| GB | 2 264 558 A | 1/1993 |
| GB | 2264558 A | 9/1993 |
| GB | 2330408 A | 4/1999 |
| GB | 2 345 879 A | 7/2000 |
| JP | 3214438 | 7/1991 |
| JP | 08-096508 | 4/1996 |
| JP | 08-138268 | 5/1996 |
| WO | WO 98/31011 | 7/1998 |
| WO | WO 00/14736 | 3/2000 |
| WO | WO 00/77104 A1 | 12/2000 |
| WO | WO 01/20591 A1 | 3/2001 |
| WO | WO 02/03106 A2 | 1/2002 |
| WO | WO 02/03386 A2 | 1/2002 |
| WO | WO 03/087888 A2 | 10/2003 |
| WO | WO 03/105075 A1 | 12/2003 |

OTHER PUBLICATIONS

JP09104679. Publication Date: Apr. 22, 1997. Oxadiazole Derivative and Its Production. (Abstract Only).
International Search Report for International application No. PCT/US2004/039467. Mailed May 10, 2005.
International Search Report for International application No. PCT/US2004/041349. Mailed Apr. 11, 2005.
International Search Report for International application No. PCT/US2004/037687. Mailed May 12, 2005.
International Search Report for International application No. PCT/US2004/038667. Mailed Jun. 2, 2005.
Cantrell, et al. "The SLIM Spectrometer" Anal. Chem. 2003, 75, 27-35.

* cited by examiner

METHOD OF AUTHENTICATING POLYMERS, AUTHENTICATABLE POLYMERS, METHODS OF MAKING AUTHENTICATABLE POLYMERS AND AUTHENTICATABLE ARTICLES, AND ARTICLES MADE THERE FROM

BACKGROUND OF INVENTION

The inventions relate to authentication technology for polymer based articles, particularly to methods of authenticating polymer based articles, methods of facilitating such authentication, and methods of making articles capable of authentication. The invention particularly relates to nondestructive authentication technology for use in data storage media made of polycarbonate such as compact disks (CDs) and digital versatile disks (DVDs).

Data storage media or optical storage media such as CDs and DVDs traditionally contain information such as machine-readable code, audio, video, text, and/or graphics. Data storage media often include one or more substrates made of polymers such as polycarbonate.

A major problem confronting the various makers and users of data storage media is the unauthorized reproduction or copying of information by unauthorized manufacturers, sellers and/or users. Such unauthorized reproduction or duplication of data storage media is often referred to as piracy and can occur in a variety of ways, including consumer level piracy at the point of end use as well as whole sale duplication of data, substrate and anti-piracy information at the commercial level. Regardless of the manner, piracy of data storage media deprives legitimate software and entertainment content providers and original electronic equipment manufacturers significant revenue and profit.

Attempts to stop piracy at the consumer level have included the placement of electronic anti-piracy signals on information carrying substrates along with the information sought to be protected. The machine readers and players of such data storage media are configured to require the identification of such anti-piracy signals prior to allowing access to the desired information. Theoretically, consumer level duplications are unable to reproduce these electronic anti-piracy signals on unauthorized copies and hence result in duplicates and copies that are unusable.

However, numerous technologies to thwart such consumer level anti-piracy technologies have been and continue to be developed. Moreover, commercial level duplications have evolved to the point that unauthorized duplicates now contain the original electronic anti-piracy circuit, code, etc. For example, commercial level duplication methods include pit copying, radio frequency (RF) copying, "bit to bit" copying and other mirror image copying techniques which result in the placement of the anti-piracy signal on the information carrying substrate of the duplicate along with the information sought to be protected. Other technologies commonly used by hackers include the modification of the computer code in order to remove anti-piracy (also referred to as copy-protection or copy-proofing) features and enable unlimited access to the data.

One anti-piracy technology aimed at combating these more sophisticated consumer and commercial level reproduction and copying practices involves the placement of 'tags' or authentication markers in substrates used in the construction of data storage media. Such tags or authentication markers can be detected at one or more points along the data storage media manufacturing or distribution chain or by the end use reader or player used to access the data on a particular CD or DVD.

For example, in Cyr et al., U.S. Pat. No. 6,099,930, tagging materials are placed in materials such as digital compact discs. A near-infrared fluorophore is incorporated into the compact disc via coating, admixing, blending or copolymerization. Fluorescence is detectable when the fluorophore is exposed to electromagnetic radiation having a wavelength ranging from 670 to 1100 nanometers.

Hubbard et al., U.S. Pat. No. 6,514,617 discloses a polymer comprising a tagging material wherein the tagging material comprises a organic fluorophore dye, an inorganic fluorophore, an organometallic fluorophore, a semi-conducting luminescent nanoparticle, or combination thereof, wherein the tagging material has a temperature stability of at least about 350 degrees C. and is present in a sufficient quantity such that the tagging material is detectable via a spectrofluorometer at an excitation wavelength from about 100 nanometers to about 1100 nanometers.

WO 00/14736 relies on one or more intrinsic physical or chemical characteristics of the substrate materials to distinguish unauthorized duplications of information-carrying substrates. Such anti-piracy characteristics may be based on performance characteristics such as (for example in the case of an optical disc) the weight and/or density of the disc; the spin rate of the disc; the acceleration and deceleration of the disc; the inertia of the disc; the spectral characteristics such as reflectance of the disc; the optical characteristics such as light transmittance of the disc; the water absorption and dimensional stability of the disc; the data transfer rate of the disc; and the degree of wobble of the disc, or combinations of such characteristics.

Catarineu Guillén, U.S. Pat. No. 6,296,911 discloses a method for obtaining the chromatic variation of objects in response to external stimuli, the method comprising the incorporation in the desired objects of various pigments having combined effects comprising a luminescent pigment, a thermochromic pigment permitting the change in the color according to the temperature and/or a hygroscopic pigment that will provoke a variation in the chromatic characteristics according to humidity.

Lucht et al., U.S. Patent application No. 2002/0149003A1 discloses a thermochromic polymer-based temperature indicator composition that comprises a polythiophene and a carrier medium. The composition is characterized in that the polythiophene is present in the medium in an amount of about 0.05 to about 5.0% by weight based on the weight of the composition. The structure of the compound is designed such that when the composition is placed in a heat exchange relationship with an article, the composition will exhibit a color change when a design temperature or a temperature beyond the design temperature is reached in the article.

However, the ability of unauthorized manufacturers, sellers, and/or users of data storage media to circumvent such practices continues to grow with increasingly sophisticated practices. For example, unauthorized manufacturers of data storage media are known to illegally obtain legitimately manufactured-tagged substrates for the purposes of making unauthorized reproductions. Moreover, the high profitability of piracy has enabled some unauthorized manufacturers and their suppliers to reverse engineer tagged substrate materials for the purpose of identifying previously unknown tags and producing similarly tagged data media storage substrate.

There is therefore a need to find methods of tagging and authenticating data storage media substrates that are currently unknown and/or unavailable to unauthorized manufacturers, sellers, and/or users of data storage media. In particular, it would be desirable to find authentication markers or combinations of authentication markers for use in data storage media substrates that are difficult to obtain, reproduce, use, and/or find for the purposes of authenticating data storage media substrates and data storage media.

BRIEF DESCRIPTION OF THE INVENTION

Disclosed herein are embodiments for a method of authenticating a polymer or an article, authenticatable polymers, methods of making authenticatable polymers and articles, and authenticatable articles made from the disclosed methods.

In one embodiment, a method for authenticating that a test polymer is a authenticatable polymer is disclosed wherein the authenticatable polymer comprises a substrate polymer and a thermochromic compound, the thermochromic compound having a first signal at a first temperature and at an authenticating wavelength, and a second signal at an authenticating temperature and the authenticating wavelength, the first and second signals being different, and the authenticating temperature being greater than the first temperature, the method comprising subjecting the test polymer to a stimulus sufficient to raise a portion of the test polymer to the authenticating temperature to create a heated portion, determining a test signal of the heated portion of the test polymer at the authenticating wavelength, and authenticating that the test polymer is a authenticatable polymer if the test signal is the same as an authenticating signal of the authenticatable polymer.

In another embodiment an authenticatable polymer is disclosed, the authenticatable polymer comprising a substrate polymer, and a thermochromic compound having a first signal at a first temperature and at an authenticating wavelength, and a second signal at an authenticating temperature and the authenticating wavelength, the first and second signals being different, and the authenticating temperature being greater than the first temperature, wherein the thermochromic compound is present in the authenticatable polymer in an amount that does not provide a visually retrievable thermochromic response.

Also disclosed are methods of making authenticatable polymers and authenticatable articles.

In one embodiment a method of making an authenticatable polymer is disclosed, the method comprising incorporating together a substrate polymer and a thermochromic compound to provide an authenticatable polymer, wherein the thermochromic compound is incorporated in an amount that does not provide a visually retrievable thermochromic response.

Also disclosed is a method of making an authenticatable article, comprising incorporating together a substrate polymer and a thermochromic compound to provide an authenticatable polymer, and forming an authenticatable article from the authenticatable polymer.

Also disclosed are authenticatable articles made from the disclosed methods.

BRIEF DESCRIPTION OF THE DRAWINGS

Referring now to the figures, which are exemplary, not limiting.

DETAILED DESCRIPTION

Figure 1:
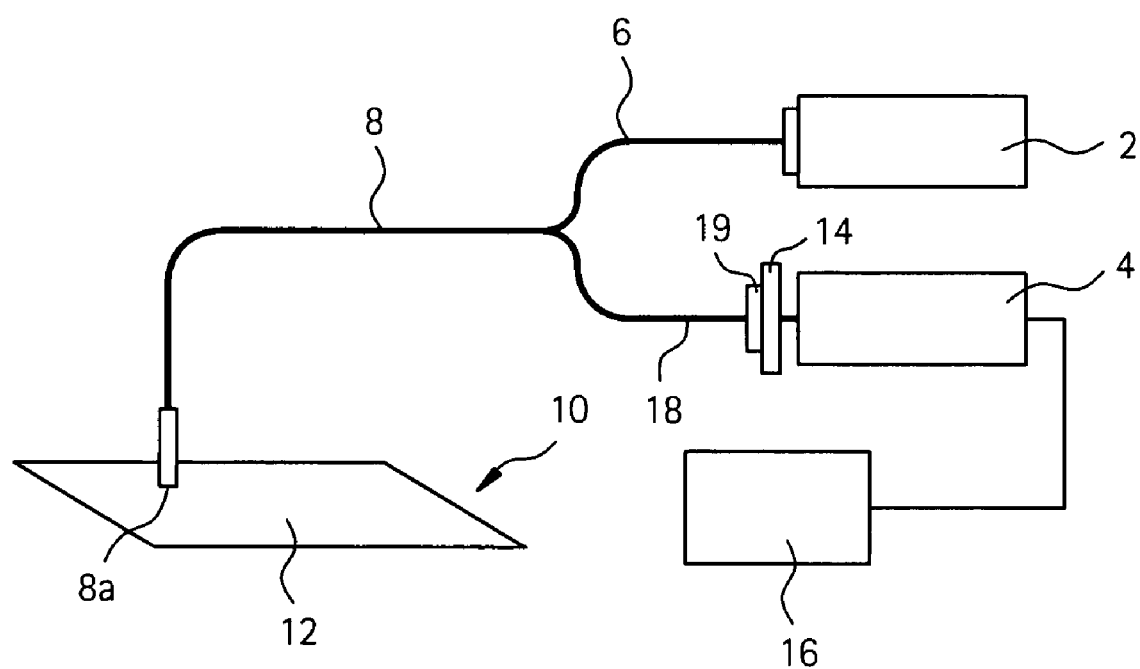
FIG. 1 represents a schematic view of an experimental setup for the method of authenticating wherein fluorescence data is utilized as the test signal.

Disclosed herein are authenticatable polymers and methods of facilitating the authentication of polymer-based articles as well as method of making authenticatable polymers that can be used to make authenticatable articles. The use of the authenticatable polymers disclosed herein in various polymer based articles allows for one or more parties at any point along the manufacturing chain, distribution chain, point of sale or point of use of the article to confirm or identify the presence or absence of the authenticatable polymer.

Authenticatable polymers and methods of authenticating provide valuable information. For example, the identification of a test polymer as an authenticatable polymer can provide one or more pieces of information such as the source of the test polymer, the source of an authenticatable article, the composition of the test polymer, whether the test polymer or authenticatable article is an unauthorized reproduction or duplication, the serial number (or lot number) of the test polymer, the date of manufacture, and the like. In some instances, a failure to authenticate that a test polymer is an authenticatable polymer will serve as proof of unauthorized duplication or copying.

Such authenticatable polymers will generally comprise a substrate polymer and a thermochromic compound. Suitable thermochromic compounds will comprise a first signal at a first temperature and at an authenticating wavelength, and a second signal at an authenticating temperature and the authenticating wavelength, the first and second signals being different, and the authenticating temperature being greater than the first temperature.

In one exemplary embodiment, the authenticatable polymers will comprise a substrate polymer, a thermochromic compound, and an amplification compound.

In one exemplary embodiment, the authenticatable polymers will comprise a substrate polymer and a thermochromic compound present in an amount that does not provide a visually retrievable or observable thermochromic response.

Some possible examples of suitable polymers which can be utilized as the substrate polymer include, but are not limited to, amorphous, crystalline and semi-crystalline thermoplastic materials: polyvinyl chloride, polyolefins (including, but not limited to, linear and cyclic polyolefins and including polyethylene, chlorinated polyethylene, polypropylene, and the like), polyesters (including, but not limited to, polyethylene terephthalate, polybutylene terephthalate, polycyclohexylmethylene terephthalate, and the like), polyamides, polysulfones (including, but not limited to, hydrogenated polysulfones, and the like), polyimides, polyether imides, polyether sulfones, polyphenylene sulfides, polyether ketones, polyether ether ketones, ABS resins, polystyrenes (including, but not limited to, hydrogenated polystyrenes, syndiotactic and atactic polystyrenes, polycyclohexyl ethylene, styrene-co-acrylonitrile, styrene-co-maleic anhydride, and the like), polybutadiene, polyacrylates (including, but not limited to, polymethylmethacrylate, methyl methacrylate-polyimide copolymers, and the like), polyacrylonitrile, polyacetals, polycarbonates, polyphenylene ethers (including, but not limited to, those derived from 2,6-dimethylphenol and copolymers with 2,3,6-trimethylphenol, and the like), ethylene-vinyl acetate copolymers, polyvinyl acetate, liquid crystal polymers, ethylene-tetrafluoroethylene copolymer, aromatic polyesters, polyvinyl fluoride, polyvinylidene fluoride, polyvinylidene chloride, Teflons, as well as thermosetting resins such as epoxy, phenolic, alkyds, polyester, polyimide, polyurethane, mineral filled silicone, bis-maleimides, cyanate esters, vinyl, and benzocyclobutene resins, in addition to blends, copolymers, mixtures, reaction products and composites comprising a of the foregoing plastics.

As used herein, the terms "polycarbonate", "polycarbonate composition", and "composition comprising aromatic carbonate chain units" includes compositions having structural units of the formula (I):

in which at least about 60 percent of the total number of $R^1$ groups are aromatic organic radicals and the balance thereof are aliphatic, alicyclic, or aromatic radicals. Preferably, $R^1$ is an aromatic organic radical and, more preferably, a radical of the formula (II):

$-A^1-Y^1-A^2-$ wherein each of $A^1$ and $A^2$ is a monocyclic divalent aryl radical and $Y^1$ is a bridging radical having one or two atoms which separate $A^1$ from $A^2$. In an exemplary embodiment, one atom separates $A^1$ from $A^2$. Illustrative, non-limiting examples of radicals of this type are —O—, —S—, —S(O)—, —S(O$_2$)—, —C(O)—, methylene, cyclohexylmethylene, 2-[2,2,1]-bicycloheptylidene, ethylidene, isopropylidene, neopentylidene, cyclohexylidene, cyclopentadecylidene, cyclododecylidene, and adamantylidene. The bridging radical $Y^1$ can be a hydrocarbon group or a saturated hydrocarbon group such as methylene, cyclohexylidene or isopropylidene.

Polycarbonates can be produced by the interfacial reaction of dihydroxy compounds in which only one atom separates $A^1$ and $A^2$. As used herein, the term "dihydroxy compound" includes, for example, bisphenol compounds having general formula as follows (III):

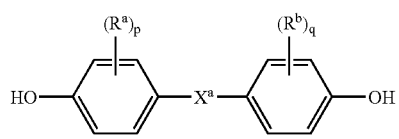

wherein $R^a$ and $R^b$ each represent a halogen atom or a monovalent hydrocarbon group and may be the same or different; p and q are each independently integers from 0 to 4; and $X^a$ represents one of the groups of formula (IV):

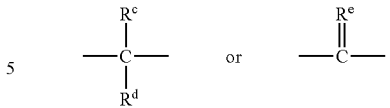

wherein $R^c$ and $R^d$ each independently represent a hydrogen atom or a monovalent linear or cyclic hydrocarbon group and $R^e$ is a divalent hydrocarbon group.

Some illustrative, non-limiting examples of suitable dihydroxy compounds include dihydric phenols and the dihydroxy-substituted aromatic hydrocarbons disclosed by name or formula (generic or specific) in U.S. Pat. No. 4,217,438. A nonexclusive list of specific examples of the types of bisphenol compounds that may be represented by formula (III) includes the following: 1,1-bis(4-hydroxyphenyl)methane; 1,1-bis(4-hydroxyphenyl)ethane; 2,2-bis(4-hydroxyphenyl)propane (hereinafter "bisphenol A" or "BPA"); 2,2-bis(4-hydroxyphenyl)butane; 2,2-bis(4-hydroxyphenyl)octane; 1,1-bis(4-hydroxyphenyl)propane; 1,1-bis(4-hydroxyphenyl)n-butane; bis(4-hydroxyphenyl)phenylmethane; 2,2-bis(4-hydroxy-1-methylphenyl)propane; 1,1-bis(4-hydroxy-t-butylphenyl)propane; bis(hydroxyaryl)alkanes such as 2,2-bis(4-hydroxy-3-bromophenyl)propane; 1,1-bis(4-hydroxyphenyl)cyclopentane; and bis(hydroxyaryl)cycloalkanes such as 1,1-bis(4-hydroxyphenyl)cyclohexane; and the like as well as combinations comprising the foregoing.

It is also possible to employ two or more different dihydric phenols or a copolymer of a dihydric phenol with a glycol or with a hydroxy- or acid-terminated polyester or with a dibasic acid or with a hydroxy acid in the event a carbonate copolymer rather than a homopolymer is desired for use. Polyarylates and polyester-carbonate resins or their blends can also be employed. Branched polycarbonates are also useful, as well as blends of linear polycarbonate and a branched polycarbonate. The branched polycarbonates may be prepared by adding a branching agent during polymerization.

These branching agents are well known and may comprise polyfunctional organic compounds containing at least three functional groups which may be hydroxyl, carboxyl, carboxylic anhydride, haloformyl and mixtures comprising a of the foregoing. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl) alpha,alpha-dimethyl benzyl)phenol), 4-chloroformyl phthalic anhydride, trimesic acid and benzophenone tetracarboxylic acid, and the like. The branching agents may be added at a level of about 0.05 to about 2.0 weight percent. Branching agents and procedures for making branched polycarbonates are described in U.S. Pat. Nos. 3,635,895 and 4,001,184. All types of polycarbonate end groups are herein contemplated.

In one embodiment, the polymer will be a polycarbonate based on bisphenol A, in which each of $A^1$ and $A^2$ is p-phenylene and $Y^1$ is isopropylidene. In one embodiment, the average molecular weight of the polycarbonate is about 5,000 to about 100,000. In another exemplary embodiment, the average molecular weight of a polycarbonate used as the polymer will be about 10,000 to about 65,000, while in another exemplary embodiment, a polycarbonate used as the polymer will have an average molecular weight of about 15,000 to about 35,000.

In monitoring and evaluating polycarbonate synthesis, it is of particular interest to determine the concentration of Fries product present in the polycarbonate. As noted, the generation of significant Fries product can lead to polymer branching, resulting in uncontrollable melt behavior. As used herein, the terms "Fries" and "Fries product" denote a repeating unit in polycarbonate having the formula (V):

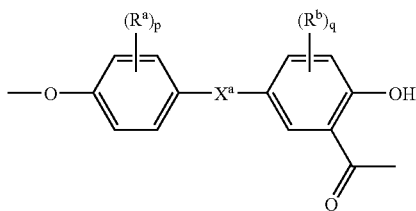

wherein $X^a$ is a bivalent radical as described in connection with formula (III) described above.

Polycarbonate compositions suitable for use as the substrate polymer may also include various additives ordinarily incorporated in resin compositions of this type. Such additives are, for example, fillers or reinforcing agents; heat stabilizers; antioxidants; light stabilizers; plasticizers; antistatic agents; mold releasing agents; additional resins; blowing agents; and the like, as well as combinations comprising a of the foregoing additives. Examples of fillers or reinforcing agents include glass fibers, asbestos, carbon fibers, silica, talc and calcium carbonate. Examples of heat stabilizers include triphenyl phosphite, tris-(2,6-dimethylphenyl)phosphite, tris-(mixed mono- and di-nonylphenyl)phosphite, dimethylbenene phosphonate and trimethyl phosphate. Examples of antioxidants include octadecyl-3-(3,5-di-tert-butyl-4-hydroxyphenyl)propionate, and pentaerythrityl-tetrakis[3-(3,5-di-tert-butyl-4-hydroxyphenyl)propionate]. Examples of light stabilizers include 2-(2-hydroxy-5-methylphenyl)benzotriazole, 2-(2-hydroxy-5-tert-octylphenyl)-benzotriazole and 2-hydroxy-4-n-octoxy benzophenone. Examples of plasticizers include dioctyl-4,5-epoxy-hexahydrophthalate, tris-(octoxycarbonylethyl)isocyanurate, tristearin and epoxidized soybean oil. Examples of the antistatic agent include glycerol monostearate, sodium stearyl sulfonate, and sodium dodecylbenzenesulfonate. Examples of mold releasing agents include stearyl stearate, beeswax, montan wax and paraffin wax. Examples of other resins include but are not limited to polypropylene, polystyrene, polymethyl methacrylate, and polyphenylene oxide. Combinations of any of the foregoing additives may be used. Such additives may be mixed at a suitable time during the mixing of the components for forming the composition.

The term 'thermochromic compounds' generally refers to compounds that change color as a function of temperature. However, 'thermochromic compounds' as used herein refers to compounds that have a first signal at a first temperature and at an authenticating wavelength, and a second signal at an authenticating temperature and at the authenticating wavelength wherein the authenticating temperature is greater than the first temperature and the first and second signals are different. The first temperature is sometimes referred to as the 'cold' state and the authenticating temperature as the 'hot' state. 'Authenticating temperature' as used herein refers to any temperature at or above the thermochromic transition of the thermochromic compound.

'Signal' as used herein refers to a response detectable by an analytical method such as vibrational spectroscopy, fluorescence spectroscopy, luminescence spectroscopy, electronic spectroscopy and the like and combinations thereof. Examples of vibrational spectroscopies are Raman, infrared, Surface Enhanced Raman and Surface Enhanced Resonance Raman spectroscopies. In one exemplary embodiment, signal refers to a response detectable by an analytical method such as fluorescence spectroscopy, luminescence spectroscopy, and the like and combinations thereof. In another exemplary embodiment, signal refers to a response detectable by fluorescence spectroscopy.

In one embodiment, the signal of the thermochromic compound will reflect changes in the fluorescence or luminescence of the thermochromic compound. The changes in fluorescence emission can be detected by observing changes in the complete emission spectrum or changes in local parts of the spectrum (i.e. by looking at the discrete intensity of the fluorescence emission at the peak location of the tag emission or by looking at ratios of fluorescence intensity at selected wavelengths that are known to exhibit different values in the "hot" and "cold" state). For example, in one embodiment, the signal may be the intensity or location of the fluorescence emitted at a particular excitation wavelength or range. In one exemplary embodiment, the signal of the thermochromic compound will be evaluated as the fluorescence emitted by an authenticatable polymer at a particular excitation wavelength, i.e., the authentication wavelength as discussed below. In one embodiment, the fluorescence intensity changes over time in response to a heat pulse will be used as a signal.

In one exemplary embodiment the first and second signals of the thermochromic compound will be different by at least about 5%, based on the fluorescence intensity or ratio of fluorescence intensity of the thermochromic compound. In another embodiment, the first and second signals of the thermochromic compound will be different by at least about 10 nm, based on the fluorescence peak location of the thermochromic compound.

Suitable thermochromic compounds for use in the disclosed methods will generally be organic materials that are selected to be chemically compatible with the polymer matrix and have a heat stability consistent with engineering plastics compounding and in particular with the processing conditions of the polymer substrate. In one embodiment, the stable thermochromic compounds will be conjugated polymers containing aromatic and/or heteroatomic units exhibiting thermochromic properties.

Illustrative examples of suitable thermochromic compounds include poly(3-alkylthiophene)s, poly(3,4-alkylenedioxythiophene)s, alkyl/aryl substituted poly(isothianaphtenes)s and corresponding copolymers, blends or combinations of the corresponding monomers.

In one embodiment, the polythiophene is generally of the structure (VI):

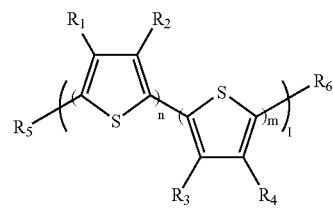

wherein $R_1$–$R_6$ is a hydrogen, substituted or unsubstituted alkyl radical, substituted or unsubstituted alkoxy radical, substituted or unsubstituted aryl radical, substituted or unsubstituted thioalkyl radical, substituted or unsubstituted trialkylsilyl radical, substituted or unsubstituted acyl radical, substituted or unsubstituted ester radical, substituted or unsubstituted amine radical, substituted or unsubstituted amide radical, substituted or unsubstituted heteroaryl or substituted or unsubstituted aryl radical, n is between 1 and 1000, m is between 0 and 1000, and 1 is between 1 and 1000. In another embodiment, $R_1-R_2$ or $R_3-R_4$ comprise a 5 or 6 membered ring. In another embodiment, $R_1-R_2$ or $R_3-R_4$ comprise a ring with 6 or more members. In yet another embodiment, $R_2-R_3$ are bridged forming a ring with 6 or more members.

In synthesizing a polythiophene for a specific design temperature, e.g. for the series of poly(3-alkylthiophene)s there is roughly an inverse correlation with the length of the n-alkane substituent and the temperature of the thermochromic transition for both the regiorandom ($R_1$=alkyl, $R_4$=alkyl, n≡0.8, m≡0.2, l =40–80, $R_2$, $R_3$, $R_5$, $R_6$=H) and regioregular ($R_1$=alkyl, n=40–80, m=0, $R_2$, $R_5$, $R_6$=H), poly(3-n-alkylthiophene)s. For regiorandom polymers longer substituents such as n-hexadecyl have lower temperature thermochromic transitions (81° C.) than shorter chain substituents such as n-octyl (130° C.). The regioregular polymers have higher thermochromic transitions than the regiorandom polymers but the same inverse correlation with chain length is observed. The n-hexadecyl and n-octyl have thermochromic transition from about 125 to about 175° C. As long as the number of thiophene units in the polymer is approximately greater than sixteen the thermochromic transition is molecular weight independent. Oligothiophenes (n+m+l<16) have lower temperature thermochromic transitions than the polythiophenes (n+m+l>16).

In one exemplary embodiment, the thermochromic compound will be a regiorandom polymer. In one exemplary embodiment, the thermochromic compound will be a regiorandom polymer in the poly(3-alkylthiophene) series. In another exemplary embodiment, the thermochromic compound will be an oligothiophene wherein (n+m+l<16).

In one embodiment, the thermochromic compound utilized will be a thermochromic compound having a thermochromic transition temperature of no less than or equal to about −30° C. In one embodiment, the thermochromic compound utilized will be a thermochromic compound having a thermochromic transition temperature of no more than or equal to about 250° C. In another embodiment, the thermochromic compound utilized will be a thermochromic compound having a thermochromic transition temperature of about 35 to about 195° C. In another exemplary embodiment, the thermochromic compound utilized will be a thermochromic compound having a thermochromic transition temperature of about 45 to about 135° C.

The thermochromic compound is added to the polymer in an amount sufficient to be detected by an analytical method as discussed below. In one embodiment, the thermochromic compound will be present in the authenticatable polymer in an amount of no more than or equal to about 10.0% by weight, based on the weight of the authenticatable polymer. In another embodiment, the thermochromic compound will be present in the authenticatable polymer in an amount of less than or equal to about 5.0% by weight, based on the weight of the authenticatable polymer. In one exemplary embodiment, the thermochromic compound will be present in the authenticatable polymer in an amount of less than or equal to about 1.0% by weight, based on the weight of the authenticatable polymer. In yet another exemplary embodiment, the thermochromic compound will be present in the authenticatable polymer in an amount of less than or equal to about 0.05% by weight, based on the weight of the authenticatable polymer. In one embodiment, the thermochromic compound will be present in the authenticatable polymer in an amount of at least 0.005% by weight, based on the weight of the authenticatable polymer.

In one exemplary embodiment, the thermochromic compound will be present in the authenticatable polymer in an amount of about 0.001% to about 10.0% by weight, based on the weight of the authenticatable polymer. In another exemplary embodiment, the thermochromic compounds will be present in an amount of about 0.01% to about 5.0% by weight, based on the weight of the authenticatable polymer, while in another, the thermochromic compounds will be present in an amount of about 0.02% to about 1.0% by weight, based on the weight of the authenticatable polymer. In one particularly exemplary embodiment, the thermochromic compounds will be present in an amount of about 0.03% to 1.0% by weight, based on the weight of the authenticatable polymer.

In one exemplary embodiment, the thermochromic compound is present in an amount of less than 0.50% by weight, based on the weight of the authenticatable polymer. In another exemplary embodiment, the thermochromic compound is present in an amount of about 0.005 to about 0.50% by weight, based on the weight of the authenticatable polymer. In another exemplary embodiment, the thermochromic compound is present in an amount of about 0.02 to less than 0.50% by weight, based on the weight of the authenticatable polymer.

In one exemplary embodiment the substrate polymer will be transparent and the thermochromic compound will be used in an amount of from 0.005 to about 0.1% by weight, based on the weight of the authenticatable polymer. Such lower concentrations of thermochromic compounds are advantageous because the resulting authenticatable polymers exhibit a more rapid switch from the 'cold' state to the 'hot' state.

In one exemplary embodiment, the thermochromic compound will be present in the authenticatable polymer in an amount that does not provide a visually retrievable thermochromic response. That is, the amount of the thermochromic compound in the authenticatable polymer does not result in a color change apparent to the unaided human eye when the authenticatable polymer is exposed to temperature at or above the thermochromic transition temperature, i.e., an authenticating temperature.

Amplification compounds may optionally be used in the authenticatable polymers disclosed herein. In one exemplary embodiment, amplification compounds are fluorescent tags that are selected to interact synergistically with the thermochromic compound in order to amplify a fluorescence signal to be detected. Fluorescent tags as used herein refers to at least one of an organic fluorophore, an inorganic fluorophore, an organometallic fluorophore, a luminescent nanoparticle, or combinations thereof. In addition, the fluorescent tags used are insensitive to polymer additives and to chemical and physical aging of the polymer.

In one exemplary embodiment, the fluorescent tags used as amplification compounds are selected from classes of dyes that exhibit high robustness against ambient environmental conditions and temperature stability of at least about 350° C., preferably at least about 375° C., and more preferably at least about 400° C. Typically, the fluorescent tags have temperature stability for a time period greater than or equal to about 10 minutes and preferably, greater than or equal to about 1 minute, and more preferably, greater than or equal to about 20 seconds.

In general, the amplification compounds will be selected such that they have an excitation wavelength that overlaps with the absorption of the thermochromic compound at the first temperature, i.e., in the "cold" state, but that exhibit less or ideally no overlap when the thermochromic compound is in the "hot" state. When such amplification compounds are used, the detection wavelength at which the test signal is evaluated will typically be the maximum emission of the amplification compound and the authentication wavelength or wavelength spectrum will be the maximum excitation wavelength of the amplification compound. In one embodiment, the authentication wavelength or wavelength spectrum will be within +/−50 nm of the maximum excitation wavelength of the amplification compound, while in another embodiment, the authentication wavelength or wavelength spectrum will be within +/−30 nm of the maximum excitation wavelength of the amplification compound. In one exemplary embodiment, the authentication wavelength or wavelength spectrum will be within +/−10 nm of the maximum excitation wavelength of the amplification compound.

The excitation range of suitable amplification compounds is typically about 100 nanometers to about 1100 nanometers, and more typically about 200 nanometers to about 1000 nanometers, and most typically about 250 nanometers to about 950 nanometers. The emission range of suitable amplification compounds is typically about 250 nanometers to about 2500 nanometers.

In one embodiment, the maximum excitation wavelength of the amplification compound will be no more than or equal to about 800 nm. In another embodiment, the maximum excitation wavelength of the amplification compound will be no less than or equal to about 250 nm. In one exemplary embodiment, the maximum excitation wavelength of the amplification compound will be about 350 nm to about 700 nm. In one exemplary embodiment, the maximum excitation wavelength of the amplification compound will be about 450 nm to about 650 nm. In one particularly exemplary embodiment, the maximum excitation wavelength of the amplification compound will be about 500 nm to about 600 nm.

Illustrative amplification compounds include fluorescent tags such as the following but are not limited to, dyes such as perylene derivatives, polyazaindacenes or coumarins, including those set forth in U.S. Pat. No. 5,573,909. Other suitable families of dyes include lanthanide complexes, hydrocarbon and substituted hydrocarbon dyes; polycyclic aromatic hydrocarbons; scintillation dyes (preferably oxazoles and oxadiazoles); aryl- and heteroaryl-substituted polyolefins ($C_2$–$C_8$ olefin portion); carbocyanine dyes; phthalocyanine dyes and pigments; oxazine dyes; carbostyryl dyes; porphyrin dyes; acridine dyes; anthraquinone dyes; anthrapyridone dyes; naphtalimide dyes; benzimidazole derivatives; arylmethane dyes; azo dyes; diazonium dyes; nitro dyes; quinone imine dyes; tetrazolium dyes; thiazole dyes; perinone dyes, bis-benzoxazolylthiophene (BBOT), and xanthene and thioxanthene dyes, indigoid and thioindigoid dyes. Fluorescent tags also include anti-stokes shift dyes that absorb in the near infrared wavelength and emit in the visible wavelength.

The following is a partial list of commercially available, suitable fluorescent and/or luminescent dyes useful as the fluorescent tag: 5-Amino-9-diethyliminobenzo(a)phenoxazonium Perchlorate7-Amino-4-methylcarbostyryl, 7-Amino-4-methylcoumarin, 7-Amino-4-trifluoromethylcoumarin, 3-(2'-Benzimidazolyl)-7-N,N-diethylamninocoumarin, 3-(2'-Benzothiazolyl)-7-diethylaminocoumarin, 2-(4-Biphenylyl)-5-(4-t-butylphenyl)-1,3,4-oxadiazole, 2-(4-Biphenylyl)-5-phenyl-1,3,4-oxadiazole, 2-(4-Biphenyl)-6-phenylbenzoxazole-1,3,2,5-Bis-(4-biphenylyl)-1,3,4-oxadiazole, 2,5-Bis-(4-biphenylyl)-oxazole, 4,4'-Bis-(2-butyloctyloxy)-p-quaterphenyl, p-Bis(o-methylstyryl)-benzene, 5,9-Diaminobenzo(a)phenoxazonium Perchlorate, 4-Dicyanomethylene-2-methyl-6-(p-dimethylaminostyryl)-4H-pyran, 1,1'-Diethyl-2,2'-carbocyanine Iodide, 1,1'-Diethyl-4,4'-carbocyanine Iodide, 3,3'-Diethyl-4,4',5,5'-dibenzothiatricarbocyanine Iodide, 1,1'-Diethyl-4,4'-dicarbocyanine Iodide, 1,1'-Diethyl-2,2'-dicarbocyanine Iodide, 3,3'-Diethyl-9,11-neopentylenethiatricarbocyanine Iodide, 1,3'-Diethyl-4,2'-quinolyloxacarbocyanine Iodide, 1,3'-Diethyl-4,2'-quinolylthiacarbocyanine Iodide, 3-Diethylamino-7-diethyliminophenoxazonium Perchlorate, 7-Diethylamino-4-methylcoumarin, 7-Diethylamino-4-trifluoromethylcoumarin, 7-Diethylaminocoumarin, 3,3'-Diethyloxadicarbocyanine Iodide, 3,3'-Diethylthiacarbocyanine Iodide, 3,3'-Diethylthiadicarbocyanine Iodide, 3,3'-Diethylthiatricarbocyanine Iodide, 4,6-Dimethyl-7-ethylaminocoumarin, 2,2'-Dimethyl-p-quaterphenyl, 2,2-Dimethyl-p-terphenyl, 7-Dimethylamino-1-methyl-4-methoxy-8-azaquinolone-2,7-Dimethylamino-4-methylquinolone-2,7-Dimethylamino-4-trifluoromethylcoumarin, 2-(4-(4-Dimethylaminophenyl)-1,3-butadienyl)-3-ethylbenzothiazolium Perchlorate, 2-(6-(p-Dimethylaminophenyl)-2,4-neopentylene-1,3,5-hexatrienyl)-3-methylbe nzothiazolium Perchlorate, 2-(4-(p-Dimethylaminophenyl)-1,3-butadienyl)-1,3,3-trimethyl-3H-indolium Perchlorate, 3,3'-Dimethyloxatricarbocyanine Iodide, 2,5-Diphenylfuran, 2,5-Diphenyloxazole, 4,4'-Diphenylstilbene, 1-Ethyl-4-(4-(p-Dimethylaminophenyl)-1,3-butadienyl)-pyridinium Perchlorate, 1-Ethyl-2-(4-(p-Dimethylaminophenyl)-1,3-butadienyl)-pyridinium Perchlorate, 1-Ethyl-4-(4-(p-Dimethylaminophenyl)-1,3-butadienyl)-quinolium Perchlorate, 3-Ethylamino-7-ethylimino-2,8-dimethylphenoxazin-5-ium Perchlorate, 9-Ethylamino-5-ethylamino-10-methyl-5H-benzo(a)phenoxazonium Perchlorate, 7-Ethylamino-6-methyl-4-trifluoromethylcoumarin, 7-Ethylamino-4-trifluoromethylcoumarin, 1,1',3,3,3',3'-Hexamethyl-4,4',5,5'-dibenzo-2,2'-indotricarboccyanine Iodide, 1,1',3,3,3',3'-Hexamethylindodicarbocyanine Iodide, 1,1',3,3,3',3'-Hexamethylindotricarbocyanine Iodide, 2-Methyl-5-t-butyl-p-quaterphenyl, N-Methyl-4-trifluoromethylpiperidino-<3, 2-g>coumarin, 3-(2'-N-Methylbenzimidazolyl)-7-N,N-diethylaminocoumarin, 2-(1-Naphthyl)-5-phenyloxazole, 2,2'-p-Phenylen-bis(5-phenyloxazole), 3,5,3'''',5''''-Tetra-t-butyl-p-sexiphenyl, 3,5,3'''',5''''-Tetra-t-butyl-p-quinquephenyl, 2,3,5,6-1H,4H-Tetrahydro-9-acetylquinolizino-<9,9a,1-gh>coumarin, 2,3,5,6-1H,4H-Tetrahydro-9-carboethoxyquinolizino-<9,9a,1-gh>coumarin, 2,3,5,6-1H, 4H-Tetrahydro-8-methylquinolizino-<9,9a, 1-gh>coumarin, 2,3,5,6-1H,4H-Tetrahydro-9-(3-pyridyl)-quinolizino-<9,9a, 1-gh>coumarin, 2,3,5,6-1H,4H-Tetrahydro-8-trifluoromethylquinolizino-<9,9a, 1-gh>coumarin, 2,3,5,6-1H,4H-Tetrahydroquinolizino-<9,9a,1-gh>coumarin, 3,3',2'',3'''-Tetramethyl-p-quaterphenyl, 2,5,2'''',5''''-Tetramethyl-p-quinquephenyl, P-terphenyl, P-quaterphenyl, Nile Red, Rhodamine 700, Oxazine 750, Rhodamine 800, IR 125, IR 144, IR 140, IR 132, IR 26, IR5, Diphenylhexatriene, Diphenylbutadiene, Tetraphenylbutadiene, Naphthalene, Anthracene, 9,10-diphenylanthracene, Pyrene, Chrysene, Rubrene, Coronene, Phenanthrene.

Fluorescent tags as used herein also include semi-conducting luminescent nanoparticles of sizes from about 1 nanometer to about 50 nanometers. Exemplary luminescent nanoparticles include, but are not limited to, CdS, ZnS, $Cd_3P_2$, PbS, or combinations thereof. Luminescent nanoparticles also include rare earth aluminates including, but not limited to, strontium aluminates doped with Europium and Dysprosium.

In one embodiment, fluorescent tags such as perylene derivatives such as Anthra[2,1,9-def:6,5,10-d'e'f']diisoquinoline-1,3,8,10(2H,9H)-tetrone, 2,9-bis[2,6-bis(1-methyethyl)phenyl]-5,6,12,13-tetraphenoxy are utilized as the amplification compounds.

In one exemplary embodiment, the fluorescent tags will be at least one of fluorescent perylene derivatives such as Lumogen Red F-300 and Orange F-240 (BASF, Germany); fluorescent anthrapyridones such as Solvent Red 149; coumarin derivatives such as Macrolex Fluorescent Red G (Bayer, Germany); thioxanthene dyes such as Marigold Orange (DayGlo) and Solvent Orange 63 (Farbtex, China); thioindigoid derivatives such as Pigment Red 181 (Farbtex, China), Vat Violet 3 (DayGlo), and Vat Red 41 (Farbtex, China) as well as combinations of such fluorescent tags.

The concentration of the amplification compounds depends on the quantum efficiency of the amplification compound, excitation and emission wavelengths, and employed detection techniques, and will generally be present in an amount of about $10^{-18}$ percent by weight to about 2 percent by weight of the authentication polymer. In another embodiment the amplification compound will be present in an amount of about $10^{-15}$ percent by weight to about 0.5 percent by weight of the authentication polymer. In one exemplary embodiment, the amplification compound will be present in an amount of about $10^{-12}$ percent by weight to about 0.05 percent by weight of the authentication polymer.

The method of authenticating disclosed herein may authenticate a test polymer or a test article formed of a test polymer. In general, the goal of the method of authentication will be to determine whether a test polymer is or is not an authenticatable polymer or whether a test article comprises an authenticable polymer. In one embodiment, the test polymer will be polycarbonate. In another embodiment, the method of authenticating will authenticate a formed article that is a data storage media comprising polycarbonate. In one exemplary embodiment, the test article will be a DVD or CD.

The test polymer or test article is subjected to a stimulus sufficient to raise a portion of the test polymer or article to an authenticating temperature. The step of subjecting a test polymer or article to a stimulus sufficient to raise a portion of the test polymer or article to an authenticating temperature to create a heated portion may be done with either a direct stimulus or an indirect stimulus.

A direct stimulus will be a source of heat that transfers thermal energy to the heated portion of the test polymer or authenticatable polymer via a heated fluid such as air or liquid. A direct heating source may be a hand device or stand-alone heating apparatus. Illustrative examples of such heating apparatus include heat guns, ovens, hot plates, and the like.

An indirect stimulus does not transfer thermal energy to the heated portion of the test polymer or authenticatable polymer via a heated fluid such as air or liquid. Rather, an indirect stimulus transfers non-thermal energy to a portion of the test polymer where the non-thermal energy is converted to thermal energy. For example, in one embodiment, the indirect stimulus will be electromagnetic radiation. In one embodiment, the electromagnetic radiation may be infrared radiation that heats a portion of the test polymer. In another embodiment, the electromagnetic radiation will be absorbed by an energy converting compound present in the authenticatable polymer that results in an internal heat buildup sufficient to stimulate the thermochromic compound.

Examples of suitable compounds that absorb electromagnetic radiation and convert it to thermal energy include near infrared (NIR) absorbers, polymers or colorants absorbing at least a portion of the electromagnetic radiation, and the like. In one exemplary embodiment, an NIR absorber and more specifically its absorption characteristics can be used to create an internal heat pulse induced by an external NIR light source such as a laser. One commercially available example of such an NIR absorber is NIR 7788, commercially available from BASF, Germany. In one embodiment, a laser with a wavelength of about 780 nm will be directed at an authenticatable polymer containing NIR 7788. The NIR 7788 will partially absorb the laser and transform the absorbed energy into heat thus raising the sample temperature above the thermochromic transition temperature, i.e., to an authentication temperature. Other examples of suitable NIR absorbers include phthalocyanine derivatives (such as Pro-Jet 830 from Avecia, Manchester, United Kingdom); Nickel, Platinum, Palladium and other organometallic complexes, ("Keysorb" NIR dyes series, available from Keystone Aniline Corporation, Chicago, Ill.; anthraquinones derivatives (Epolin 9000 series available from Epolin Inc., Newark, N.J.); indonapthol derivatives; Squarylium and croconium dyes; organic salts such as those from oxazine, thiazine and other azine derivatives; and the like.

An advantage of the disclosed method is that only a portion of the test polymer or article need be heated to the authentication temperature. In particular, the portion of the test polymer or article to be heated corresponds to the size of the test sample needed to obtain the test signal at the authenticating wavelength. The size could be as small as the spot created by a laser, i.e. about 1 micron, to the size of an article. In one embodiment, the portion of the test polymer or article to be heated will be about 0.1 cm to about 20 cm in diameter. In another embodiment, the portion of the test polymer or article to be heated will be about 0.5 cm to about 15 cm in diameter.

The authentication temperature depends on the thermochromic transition temperature of the thermochromic compound as discussed above. Authentication temperature as used herein refers to a temperature that is greater than or equal to about the thermochromic transition temperature of the authenticatable polymer. Digital Scanning Calorimetry (DSC) can be used to identify the thermochromic transition temperature of the thermochromic compound used in the authenticatable polymer when it is unknown. Typically, due to the inertia of the authenticatable polymer and the compositions of likely test polymers, the portion of the test polymer to be heated needs to be heated to at least 5° C. above the thermochromic transition temperature. Thus, in one embodiment, the authentication temperature will be a temperature that is greater than or equal to about 5° C. more than the thermochromic transition temperature of the thermochromic compound. In one embodiment, the authentication temperature will be greater than or equal to about 15° C. above the thermochromic transition temperature of the thermochromic compound used in the authenticatable polymer. In another embodiment, the authentication temperature will be greater than or equal to about 25° C. above the thermochromic transition temperature of the thermochromic compound used in the authenticatable polymer while in another exemplary embodiment, the authentication temperature will be greater than or equal to about 35° C. above the thermochromic transition temperature of the thermochromic compound used in the authenticatable polymer.

In one embodiment, the heated portion of the test polymer or article will be raised to an authentication temperature of no less than or equal to about 80° C. for a thermochromic compound with a transition of about 65° C. In one embodiment, the authentication temperature will be at least 20° C., while in another embodiment; the authentication temperature will be about 40 to about 200° C. In one exemplary embodiment, the authentication temperature will be about 50 to about 140° C. It must be noted that the thermochromic compound is preferably selected for a given polymer substrate so that the authentication temperature does not create visible warping of the test article or visible melting of the authenticatable polymer during authentication. In one exemplary embodiment, the authentication temperature will be selected above the thermochromic transition temperature and below the glass transition temperature of the polymer substrate.

The duration of the time to which a test polymer or article is subjected to a heat source sufficient to raise a portion of the test polymer to an authenticating temperature will vary depending on the size of the heated portion, the composition of the polymer, the nature and concentration of the thermochromic compound, the stimulus, the method used to create the heated portion, the presence of additives that will increase heat conductivity in the substrate (such as alumina, metallic fillers and the like). In one embodiment, the test polymer or article will be subjected to a heat source for a time of no less than or equal to about 1 second. In another embodiment, the test polymer or article will be subjected to a heat source for a time of no more than or equal to about 600 s (10 minutes). In one embodiment, the test polymer or article will be subjected to a heat source for a time of about 5 to 300 s. In one exemplary embodiment, the test polymer or article will be subjected to a heat source for a time of about 10 to 150 s.

The determination of a test signal of the heated portion of the test polymer will generally be done with the foreknowledge of the particular authenticating wavelength of the authenticatable polymer for which a confirmation is desired. The particular authenticating wavelength of an authenticatable polymer will depend upon a variety of factors such as the nature of the thermochromic compound, the loading of the thermochromic compound, the presence of a fluorescent tag, the loading of a fluorescent tag, the nature of a fluorescent tag, the type of polymer and the like. The unavailability of or the difficulty in determining such foreknowledge is an advantage of the disclosed method.

The first and second signals of the authenticatable polymers used in the methods of authentication disclosed herein are a reflection of the fact that the thermochromic compounds emit energy of different wavelengths when at different temperatures even though the emissions are in response to a constant wavelength or wavelength spectrum. The term 'authenticating wavelength' as used herein refers to the wavelength of the electromagnetic radiation used to excite the thermochromic compounds and may refer to a single wavelength or a wavelength spectrum. In one embodiment, the method of authenticating a test polymer will include exciting the test polymer with a light source and detecting the changes in the fluorescence emitted from the thermochromic compound relative to the first temperature and the authenticating temperature. In one exemplary embodiment, the authenticating or excitation wavelength will be the wavelength that results in the maximum emission from the thermochromic compound at the authenticating temperature.

Authenticating wavelength is thus defined in one embodiment as the selected wavelength(s) at which the changes in fluorescence emission from the thermochromic compound upon exposure to thermal stimulus are detectable. In one embodiment, the authenticating wavelength is typically selected based on the location of the maximum emission of the thermochromic compound in the "hot" state, i.e., the authenticating temperature. In one embodiment, the authenticating wavelength could be +/−50 nm of the wavelength that results in the maximum emission, while in another embodiment, the authenticating wavelength will be +/−30 nm of the maximum emission wavelength. In one exemplary embodiment, the authenticating wavelength will be +/−10 nm of the maximum emission wavelength.

In one embodiment, the authentication wavelength of the authenticatable polymer will be no more than or equal to about 800 nm. In another embodiment, the authentication wavelength of the authenticatable polymer will be no less than or equal to about 250 nm. In one exemplary embodiment, the authentication wavelength of the authentication polymer will be about 350 nm to about 700 nm. In one exemplary embodiment, the authentication wavelength of the authenticatable polymer will be about 450 nm to about 650 nm. In one particularly exemplary embodiment, the authentication wavelength of the authenticatable polymer will be about 500 nm to about 600 nm.

In one embodiment, the first and second signals of the authenticatable polymer will be the wavelength or wavelength spectrum of the light that is emitted in response to the authenticating or excitation wavelength or a calculation based on the determination of such emission wavelengths. It will be appreciated that such first and second signals or 'detection wavelengths' will be a function of the thermochromic compound and any amplification compounds. In one embodiment, the wavelength of the emitted light may be referred to as the detection wavelength and will generally be from 300 to 2500 nm. In another embodiment, the detection wavelength is selected in the range 350 to 1100 nm. In one exemplary embodiment, the detection wavelength is selected between 400 to 800 nm. In another exemplary embodiment, the detection wavelength is selected between 450 to 750 nm. In another particularly exemplary embodiment, the detection wavelength is selected to be from 450 to 650.

The test signal that is obtained may be a determination of the first signal, the second signal, a combination thereof, or a calculation based one or more of such signals. For example, the test signal may be at least one of the intensity of fluorescence, the shape and/or location of the fluorescence peak, the duration or decay of the fluorescence over time or after removal of a heat source, the ratio of fluorescence intensity at selected wavelengths and combinations of these signals.

Test signals may be determined using analytical techniques such as vibrational spectroscopy, fluorescence spectroscopy, luminescence spectroscopy, electronic spectroscopy and the like and combinations thereof. In one exemplary embodiment, the test signal will be determined using an analytical technique selected from the group consisting of fluorescence spectroscopy or luminescence spectroscopy. In one exemplary embodiment, the test signal will be determined using fluorescence spectroscopy.

In one embodiment, the test signal will be determined via the measurement of at least one of reflection, emission, fluorescence, or luminescence. In one exemplary embodiment, the test signal will be determined via the measurement of at least one of fluorescence or luminescence.

In one embodiment, the test signals will be determined using an experimental setup as set forth in FIG. 1. A heat source 2 and a portable spectrofluorometer 4 are used to determine a test signal of a test polymer 10. The spectrofluorometer 4 is equipped with a shutter 18 and/or an optical filer 14. Light from the laser 2 is focused into a first optical arm 6, one of two arms of a bifurcated fiber-optic reflection probe 8. Emission light from the sample 10 is collected when the common end 8a of the fiber-optic probe 8 is positioned near the sample 10 at a 0 or 45 angle to the normal to the surface 12. The second optical fiber arm 19 of the probe 8 is coupled to the spectrometer 4. In some experimental setups, excitation light may be blocked from entering the spectrometer 4 with the long-pass optical filter 14. Processing of collected spectra is performed using appropriate software on a computer 16. One example of appropriate software is KaleidaGraph of Synergy Software, Reading, Pa.

In another embodiment, a detection system based on the use of two lasers (one to excite the tags and the other to create the heat pulse/temperature increased) may be used. The detection systems may be handheld to allow easy detection in the field or stationary.

Figure 7:
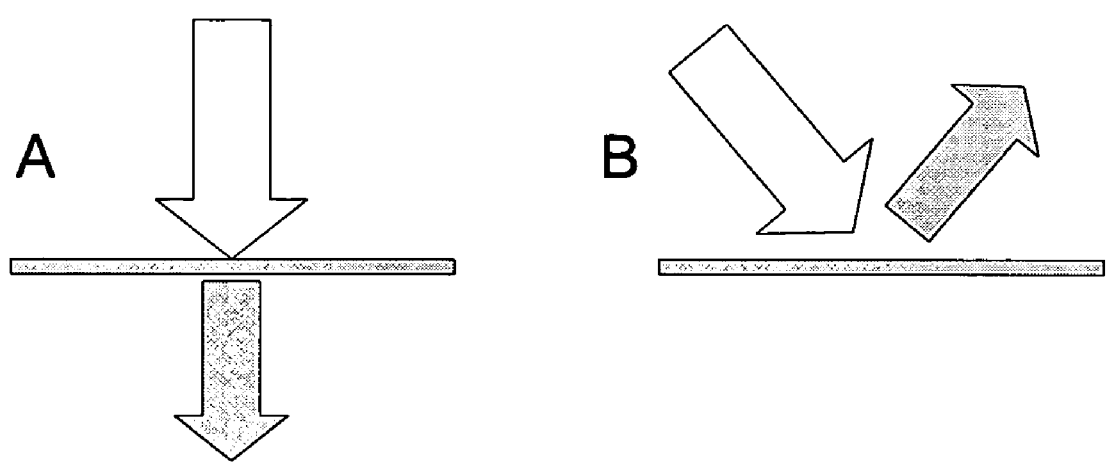
FIG. 7 is a schematic illustration of approaches for absorption and fluorescence measurements.

FIG. 7 shows one embodiment used to perform the fluorescence analysis of a sample. FIG. 7 shows approaches (A) and (B) respectively for (A) absorption and (B) fluorescence measurements where fluorescence analysis is performed in the front-surface-illumination configuration. Such configuration permits the evaluation of very minute concentrations of a fluorescent taggant in presence of strong absorbance of a polymer matrix.

In one embodiment, the test polymer will be in the shape of a formed article having thin edges and the detection of the changes in fluorescence emission from exposure to a stimulus will be done at these thin edges of the article (edge fluorescence) while the light source used for the excitation illuminates the article from the top, i.e., perpendicular to the surface of the article or at some angle to the normal to the surface (from 0 to about 80 degrees). In one exemplary embodiment, the formed article will be a data storage media device such as a CD or DVD.

A test polymer may be authenticated as an authenticatable polymer if the test signal is substantially the same as an authenticating signal of the authenticatable polymer. In one embodiment, this will mean that the test signals for both the test polymer and the authenticatable polymer will have a difference in value of less than or equal to about 5%. In other embodiments, variations between the test signals of the test polymer and the authenticatable polymer of up to +/−20% can be tolerated, while in other embodiments, variations of less than about +/−10% will be found.

In addition to the polymer, thermochromic compounds, and fluorescent tags, the authenticatable polymers or authenticatable polymers disclosed herein may optionally include various additives ordinarily incorporated in resin compositions of this type. Such additives may include antioxidants, heat stabilizers, anti-static agents (tetra alkylammonium benzene sulfonate salts, tetra alkylphosphonium benzene sulfonate salts, and the like), mold releasing agents (pentaerythritol tetrastearate; glycerol monstearate, and the like), and the like, and combinations comprising any of the foregoing. For example, the authenticatable polymer composition can comprise heat stabilizer from about 0.01 weight percent to about 0.1 weight percent; an antistatic agent from about 0.01 weight percent to about 1 weight percent; and a mold releasing agent from about 0.1 weight percent to about 1 weight percent of a mold releasing agent; based upon the weight of the authenticatable polymer.

Some possible antioxidants include, for example, organophosphites, e.g., tris(nonyl-phenyl)phosphite, tris(2,4-di-t-butylphenyl)phosphite, bis(2,4-di-t-butylphenyl)pentaerythritol diphosphite, distearyl pentaerythritol diphosphite and the like; alkylated monophenols, polyphenols and alkylated reaction products of polyphenols with dienes, such as, for example, tetrakis[methylene(3,5-di-tert-butyl-4-hydroxyhydrocinnamate)]methane, 3,5-di-tert-butyl-4-hydroxyhydrocinnamate octadecyl, 2,4-di-tert-butylphenyl phosphite, and the like; butylated reaction products of para-cresol and dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds, such as, for example, distearylthiopropionate, dilaurylthiopropionate, ditridecylthiodipropionate, and the like; amides of beta-(3,5-di-tert-butyl-4-hydroxyphenyl)-propionic acid; and the like, as well as combinations of the foregoing.

Other potential additives which may be employed comprise: UV absorbers; stabilizers such as light and thermal stabilizers (e.g., acidic phosphorous-based compounds); hindered phenols; zinc oxide, zinc sulfide particles, or combination thereof; lubricants (mineral oil, and the like), plasticizers, dyes used as a coloring material (anthraquinones, anthrapyridones, methane dyes, quinophthalones, azo dyes, perinones, and the like); among others, as well as combinations of the foregoing additives.

In order to aid in the processing of the authenticatable polymer, particularly when the polymer is polycarbonate, catalyst(s) may also be employed, namely in the extruder or other mixing device. The catalyst typically assists in controlling the viscosity of the resulting material. Possible catalysts include hydroxides, such as tetraalkylammonium hydroxide, tetraalkylphosphonium hydroxide, and the like, with diethyldimethylammonium hydroxide and tetrabutylphosphonium hydroxide preferred. The catalyst(s) can be employed alone or in combination with quenchers such as acids, such as phosphoric acid, and the like. Additionally, water may be injected into the polymer melt during compounding and removed as water vapor through a vent to remove residual volatile compounds.

The authenticatable polymers disclosed herein are produced by using a reaction vessel capable of adequately mixing various precursors, such as a single or twin screw extruder, kneader, blender, or the like.

Methods for incorporating the thermochromic compounds and optionally the amplifier compounds, into the substrate polymer include, for example, solution casting, admixing, blending, or copolymerization. The thermochromic compounds and the amplifier compounds can be incorporated into or onto the substrate polymer such that they are uniformly dispersed throughout the authenticatable polymer or such that they are dispersed on a portion of the authenticatable polymer. In one exemplary embodiment, the thermochromic compounds and the amplifier compounds will be incorporated into the substrate polymer such that they are uniformly dispersed throughout the authenticatable polymer. The thermochromic compounds and the amplifier compounds can be incorporated into the polymer in the polymer manufacturing stage, during the polymer compounding step, during polymer processing into articles, or combinations thereof. It is possible to incorporate both the thermochromic compounds and the amplifier compounds simultaneously or separately. In one embodiment, one or more thermochromic compounds and optional amplification compounds will be introduced using a concentrate (i.e. masterbatch) either during the polymer compounding stage or during the article forming.

For example, the polymer precursors for the substrate polymer can be premixed with the thermochromic compounds and the amplifier compounds (e.g., in a pellet, powder, and/or liquid form) and simultaneously fed using a gravimetric or volumetric feeder into the extruder, or the thermochromic compounds and the fluorescent tags can be optionally added in the feed throat or through an alternate injection port of the injection molding machine or other molding. Optionally, in one embodiment, a substrate polymer can be produced and the thermochromic compounds and the amplifier compounds can be dispersed on a portion of a substrate polymer by coating, molding, or welding on a portion of an authenticatable polymer there to. In one exemplary embodiment, the thermochromic compounds and optional amplification compounds will be homogenously distributed unless they were placed in a carrier that is not miscible with the substrate polymer.

In one embodiment, the thermochromic compounds will be incorporated into the substrate polymer by admixing, blending, compounding or copolymerization. In one exemplary embodiment, the thermochromic compounds will be incorporated into the polymer by forming a dry blend of the thermochromic compound in the polymer and compounding the resulting mixture.

In one embodiment, the amplification compounds will be incorporated into the substrate polymer by admixing, blending, compounding or copolymerization. In one exemplary embodiment, the amplification compounds will be incorporated into the substrate polymer by adding the amplification compounds in the melt during the compounding step. Such additions may, in one embodiment, be done via a side feeder.

In another embodiment, the thermochromic compounds and the amplification compounds will be incorporated into the substrate polymer by adding the thermochromic compounds and amplification compounds in the melt during the compounding. In one embodiment, such additions may be done via a side feeder. In another exemplary embodiment, the thermochromic compounds and the amplification compounds will be incorporated by compounding using a twin-screw extruder and adding the thermochromic compounds and amplification compounds to the melt via a side feeder.

When the substrate polymer precursors are employed, the extruder should be maintained at a sufficiently high temperature to melt the polymer precursors without causing decomposition thereof. For polycarbonate, for example, temperatures of about 220° C. to about 360° C. can be used in one embodiment. In another embodiment temperatures of about 260° C. to about 320° C. are utilized. Similarly, the residence time in the extruder should be controlled to minimize decomposition. Residence times of up to about 10 minutes can be employed, with up to about 5 minutes used in one embodiment, up to about 2 minute used in another embodiment, and up to about 1 minute used in yet another embodiment. Prior to extrusion into the desired form (typically pellets, sheet, web, or the like), the resulting mixture can optionally be filtered, such as by melt filtering and/or the use of a screen pack, or the like, to remove undesirable contaminants or decomposition products.

The authenticatable polymers may be used for any application in which the physical and chemical properties of the material are desired. In one embodiment, the authenticatable polymers are used for data storage media. Other embodiments include packaging material (and especially drug packaging), automotive parts like lenses, telecom accessories (like cell phone covers), computers and consumer electronics, construction materials, medical devices, eyeware products, films and sheets (including those used in display applications) and the like.

After the authenticatable polymer composition has been produced, it can be formed into a data storage media using various molding techniques, processing techniques, or combination thereof. Possible molding techniques include injection molding, film casting, extrusion, press molding, blow molding, stamping, and the like. One possible process comprises an injection molding-compression technique where a mold is filled with a molten polymer. The mold may contain a preform, inserts, fillers, etc. The authenticatable polymer is cooled and, while still in an at least partially molten state, compressed to imprint the desired surface features (e.g., pits, grooves, edge features, smoothness, and the like), arranged in spiral concentric or other orientation, onto the desired portion(s) of the formed part, i.e. one or both sides in the desired areas. The formed part is then cooled to room temperature. Once the formed part has been produced, additional processing, such as electroplating, coating techniques (spin coating, spray coating, vapor deposition, screen printing, painting, dipping, and the like), lamination, sputtering, and combinations comprising a of the foregoing processing techniques, among others known in the art, may be employed to dispose desired layers on the substrate.

An example of a polycarbonate data storage media comprises an injection molded polycarbonate substrate of the authenticatable polymers disclosed herein that may optionally comprise a hollow (bubbles, cavity, and the like) or filled (metal, plastics, glass, ceramic, and the like, in various forms such as fibers, spheres, particles, and the like) core.

In one embodiment when a formed authenticatable or test article is a data storage media, the authenticatable polymer will preferably be used to form the substrate(s) that will be read through by a laser in a data storage media player device. The reason is that it is significantly more difficult to fake the response of an authenticatable polymer and ensure that the technology used does not impact playability of the media. In a data storage media having two substrates, such as a DVD, one or both substrates can be formed using the authenticatable polymers. In one exemplary embodiment, the substrate of a DVD formed of the authenticatable polymer will be the layer read by a laser in a DVD player device.

Disposed on this substrate of the data storage media are various layers including: a data layer, dielectric layer(s), a reflective layer(s), and/or a protective layer, as well as combinations comprising the foregoing layers. These layers comprise various materials and are disposed in accordance with the type of media produced. For example, for a first surface media, the layers may be protective layer, dielectric layer, data storage layer, dielectric layer, and then the reflective layer disposed in contact with the substrate, with an optional decorative layer disposed on the opposite side of the substrate. Meanwhile, for one type of optical media, the layers may be optional decorative layer, protective layer, reflective layer, dielectric layer, and data storage layer, with a subsequent dielectric layer in contact with the substrate. Optical media may include, but is not limited to, any conventional pre-recorded, re-writable, or recordable formats such as: CD, CD-R, CD-RW, DVD, DVD-R, DVD-RW, DVD+RW, DVD-RAM, high-density DVD, magneto-optical, and others. It is understood that the form of the media is not limited to disk-shape, but may be any shape which can be accommodated in a readout device.

The data storage layer(s) may comprise any material capable of storing retrievable data, such as an optical layer, magnetic layer, or a magneto-optic layer. Typically the data layer has a thickness of up to about 600 Angstroms (Å) or so, with a thickness up to about 300 Å preferred. Possible data storage layers include, but are not limited to, oxides (such as silicone oxide), rare earth elements—transition metal alloys, nickel, cobalt, chromium, tantalum, platinum, terbium, gadolinium, iron, boron, others, and alloys and combinations comprising a of the foregoing, organic dye (e.g., cyanine or phthalocyanine type dyes), and inorganic phase change compounds (e.g., TeSeSn, InAgSb, and the like).

The protective layer(s), which protect against dust, oils, and other contaminants, can have a thickness of greater than about 100 microns (μ) to less than about 10 Å in one embodiment, with a thickness of about 300 Å or less in other embodiments, and a thickness of about 100 Å or less in other exemplary embodiments. The thickness of the protective layer(s) is usually determined, at least in part, by the type of read/write mechanism employed, e.g., magnetic, optic, or magneto-optic. Possible protective layers include anti-corrosive materials such as gold, silver, nitrides (e.g., silicon nitrides and aluminum nitrides, among others), carbides (e.g., silicon carbide and others), oxides (e.g., silicon dioxide and others), polymeric materials (e.g., polyacrylates or polycarbonates), carbon film (diamond, diamond-like carbon, and the like), among others, and combinations comprising a of the foregoing.

The dielectric layer(s), which may be disposed on one or both sides of the data storage layer and are often employed as heat controllers, can typically have a thickness of up to or exceeding about 1,000 Å and as low as about 200 Å or less. Possible dielectric layers include nitrides (e.g., silicon nitride, aluminum nitride, and others); oxides (e.g., aluminum oxide); carbides (e.g., silicon carbide); and combinations comprising of the foregoing materials, among other materials compatible within the environment and preferably not reactive with the surrounding layers.

The reflective layer(s) should have a sufficient thickness to reflect a sufficient amount of energy (e.g., light) to enable data retrieval. Typically the reflective layer(s) can have a thickness of up to about 700 Å or so, with a thickness of about 300 Å to about 600 Å being used in some exemplary embodiments. Possible reflective layers include any material capable of reflecting the particular energy field, including metals (e.g., aluminum, silver, gold, titanium, silicon, and alloys and mixtures comprising a of the foregoing metals, and others).

In addition to the data storage layer(s), dielectric layer(s), protective layer(s) and reflective layer(s), other layers can be employed such as lubrication layer and others. Useful lubricants include fluoro compounds, especially fluoro oils and greases, and the like In one embodiment, the authenticatable polymers will be formed into the substrate of a data storage media. In one exemplary embodiment, the authenticatable polymer will comprise the substrate of an optical storage media. In one particularly exemplary embodiment, the authenticatable polymer will comprise at least one substrate of a digital versatile disk (DVD).

Illustrative DVDs comprising the authenticatable polymers disclosed herein comprise two bonded plastic substrates (or resin layers), each typically having a thickness less than or equal to about 1.0 millimeter (mm), with a thickness of less than or equal to about 0.7 mm preferred. A thickness of greater than or equal to about 0.4 mm is also preferred. At least one of the two bonded plastic substrates comprises one or more layers of data. The first layer, generally called layer zero (or L0), is closest to the side of the disk from which the data is read (readout surface). The second layer, generally called layer 1 (L1), is further from the readout surface. Disposed between L0 (3) and L1 (5) are typically an adhesive and optionally a protective coating or separating layer. Single sided DVD's (i.e., those that will be read from a single readout surface disposed on one side of the DVD), can additionally comprise a label disposed on the side of the DVD opposite the readout surface. In one embodiment, one or both of the first layer and the second layer will be comprised of the authenticatable polymers. In one exemplary embodiment, the first layer will be comprised of the authenticatable polymer.

In the case of a single layer read from a readout surface (e.g. DVD 5, DVD 10), a stamped surface is covered with a thin reflective data layer by a sputtering or other deposition process. This creates a metallic coating typically about 60 to about 100 angstroms (Å) thick. For two data layer DVDs that are read from the same readout surface (e.g. DVD 9, DVD 14, DVD 18), the laser must be able to reflect from the first layer when reading it, but also focus (or transmit) through the first layer when reading the second layer. Therefore, the first layer is "semi-transparent" (i.e., semi-reflective), while the second layer is "fully-reflective". Under current standards set by the Consortium for Optical Media, metallization combination for the fully-reflective and semi-reflective data layers, as measured per the electrical parameter R14H (as described in ECMA specifications #267), should be about 18 percent (%) to about 30% at the wavelength of the laser. In the present DVD's, the laser wavelength generally employed is less than or equal to about 700 nm, with about 400 nm to about 675 nm preferred, and about 600 nm to about 675 nm more preferred. Although these metallization standards were set for DVD data layers employed with colorless, optical quality resin, they are equally applied to DVD systems with colored resin.

When color is added to the resin, light transmission through and reflected from the substrate is effected. The metallization nature and thickness on the semi-reflective and fully reflective (L0 and L1) layers is adapted for the light transmission of the substrate. Desired reflectivity can be obtained by balancing the metallization thickness with the reflectivity of the semi-reflective data layer, and by adjusting the thickness of the fully reflective data layer to ensure its reflectivity is within the desired specification.

Metallization for the individual data layer(s) can be obtained using various reflective materials. Materials, e.g., metals, alloys, and the like, having sufficient reflectivity to be employed as the semi-reflective and/or fully reflective data layers, and which can preferably be sputtered onto the substrate, can be employed. Some possible reflective materials comprise gold, silver, platinum, silicon, aluminum, and the like, as well as alloys and combinations comprising at least one of the foregoing materials. For example, the first/second reflective data layer metallization can be gold/aluminum, silver alloy/aluminum, silver alloy/silver alloy, or the like.

In addition to the overall reflectivity of each layer, the difference in reflectivity between subsequent reflective data layers should be controlled, in order to ensure sufficient reflectivity of the subsequent layer. Preferably, the difference in reflectivity between subsequent layers (e.g., the first and second layers) is less than or equal to about 5%, with less than or equal to about 4% preferred, and less than or equal to about 3.0% more preferred. It is further preferred to have a reflectivity difference between the adjacent reflective data layers of greater than or equal to about 0.5%, with greater than or equal to about 1% more preferred. It should be noted that although described in relation to two layers, it is understood that more than two layers could be employed, and that the difference in reflectivity between subsequent layers should be as set forth above.

The reflective data layers are typically sputtered or otherwise disposed on a pattern (e.g., surface features such as pits, grooves, asperities, start/stop orientator, and/or the like) formed into a surface of the substrate via molding, embossing, or the like. Depositions, for example, can comprise sputtering a semi-reflective data layer over a first patterned surface. A separator layer or protective coating can then be disposed over the semi-reflective data layer. If a multiple data layer DVD (e.g., DVD 14, DVD 18, or the like) is to be formed, a $2^{nd}$ patterned surface can be formed (e.g., stamped or the like) in the side of the separator layer opposite the semi-reflective data layer. A fully reflective data layer can then be sputtered or otherwise deposited on the separator layer. Alternatively, for DVD 14 construction, the fully reflective data layer can be deposited on a patterned surface of a $2^{nd}$ substrate (or resin layer). A separate layer or protective coating is then disposed on one or both of the semi-reflective data layer and the fully reflective data layer. A bonding agent or adhesive can then be disposed between the two substrates and they can be bonded together to form a disk. Optionally, several semi-reflective data layers can be deposited with a separator layer between each subsequent layer.

The reflectivity of the reflective data layer(s) can be about 5% to about 100%, depending upon the number of reflective layers. If a single reflective data layer is employed, the reflectivity is preferably about 30% to about 100%, with about 35% to about 90% more preferred, and about 45% to about 85% even more preferred. If a dual reflective data layer is employed, the reflectivity of the data layers is preferably about 5% to about 45%, with about 10% to about 40% more preferred, about 15% to about 35% even more preferred, and about 18% to about 30% especially preferred. Finally, if multiple reflective data layers (e.g., greater than 2 reflective data layers readable from a single reading surface) are employed, the reflectivity is preferably about 5% to about 30%, with about 5% to about 25% more preferred. The especially preferred ranges are currently based upon the ECMA specification #267, wherein the reflectivity is either about 18% to about 30% reflectivity for a dual layered DVD (e.g., at least one fully reflective layer and at least one semi-reflective layer) or about 45% to about 85% reflectivity for a single layer DVD (e.g., one fully reflective layer).

In one embodiment, the authenticatable polymers used to make these DVD substrates will enables the transmission of about 60% to less than 94% of light therethrough, in the wavelength region of the laser. Within that transmission range, preferably, the transmissivity is greater than or equal to about 70%, with greater than or equal to about 74% more preferred, and greater than or equal to about 78% especially preferred. Depending upon the type and amount of colorant employed, the transmissivity can be less than or equal to about 92%, with less than or equal to about 88% and even less than or equal to about 85% possible, depending upon the type of colorant. It should be noted that as the transmissivity of the substrate decreases, the ability to attain the desired adhesion of the substrates becomes more difficult. Preferably, the substrate comprises polycarbonate, with a primarily polycarbonate (e.g., greater than or equal to about 80% polycarbonate) substrate especially preferred.

EXAMPLES

Example 1

A heat stable organic fluorophore (Lumogen F Red 300, BASF, Germany) was selected for the experiment. This particular fluorophore has a maximum absorption located at about 578 nm, a fluorescence emission located at about 615 nm and a fluorescence yield greater than 90%. In order to incorporate this fluorophore at a tracer level (about 1 ppm in the final article), it was first compounded into polycarbonate to form a masterbatch with a fluorophore content of 0.005 pph (Lumogen F-300 MB). The thermochromic material was selected to be chemically stable in polycarbonate and able to sustain the processing conditions of this engineering polymer. For this example, a regio-random poly(3-octadecylthiophene) was selected (P3ODT lot #YW1202, available from the University of Rhode Island, Kingston, R.I., USA). This thermochromic material is red at room temperature and turns into a red-shade yellow above the thermochromic transition. Although this material is said to exhibit a thermochromic transition at 65° C., practical experiments have demonstrated that P3DOT requires practically a temperature of about 100° C. (surface temperature of the heater) to undergo a rapid thermochromic change.

The tag combinations were incorporated into optical quality (OQ) polycarbonate formulations via compounding on a twin-screw extruder. The OQ polycarbonate resin formulations used contain a polycarbonate resin with an average molecular weight number Mw of about 17,700 (measured using Gel Permeation Chromatography against absolute polycarbonate standards), a phosphite heat stabilizer and a mold release agent. Plaque samples (thickness 0.60 and 1.20 mm) from the various formulations were subsequently obtained by injection molding of the pellets formed after the extrusion step. The tag concentrations for the various samples are presented in Table 1.

TABLE 1

| | Sample composition (in pph). | | | |
|---|---|---|---|---|
| Composition | MWB0703031-2 | MWB0703031-3 | MWB0703031-4 | MWB0703031-5 |
| OQ PC resin | 100 | 100 | 100 | 100 |
| Heat stabilizer | 0.02 | 0.02 | 0.02 | 0.02 |
| Mold release | 0.03 | 0.03 | 0.03 | 0.03 |
| Lumogen (™) F-300 MB | | 2 | 2 | 2 |
| P3DOT | 0.05 | | 0.05 | 0.05 |
| NIR absorber | | | | 0.0017 |

An experimental setup for analysis of polymeric articles is shown in FIG. 1. Fluorescence measurements of polymeric articles were performed using a miniature 532-nm laser (Nanolase, France) as the heat source 2 and a portable spectrofluorometer 4. The spectrofluorometer 4 (Ocean Optics, Inc., Dunedin, Fla., Model ST2000) was equipped with a 200-µm slit, 600-grooves/mm grating blazed at 400 nm and covering the spectral range from 250 to 800 nm with efficiency greater than 30%, and a linear CCD-array detector. Light from the laser 2 was focused into a first optical arm 6, one of two arms of a "six-around-one" bifurcated fiber-optic reflection probe 8 (Ocean Optics, Inc., Model R400-7-UV/VIS). Emission light from the sample 10 was collected when the common end 8 of the fiber-optic probe 8 was positioned near the sample 10 at a 0 or 45 angle to the normal to the surface 12. The second optical fiber arm 12 of the probe 8 was coupled to the spectrometer 4. In some experiments, excitation light was blocked from entering the spectrometer 4 with a long-pass optical filter 14. Processing of collected spectra was performed using KaleidaGraph (Synergy Software, Reading, Pa.) on a computer 16.

Heating of the polymeric articles was performed using a built-in-house heater or a heat gun.

Example 2

Figure 2:
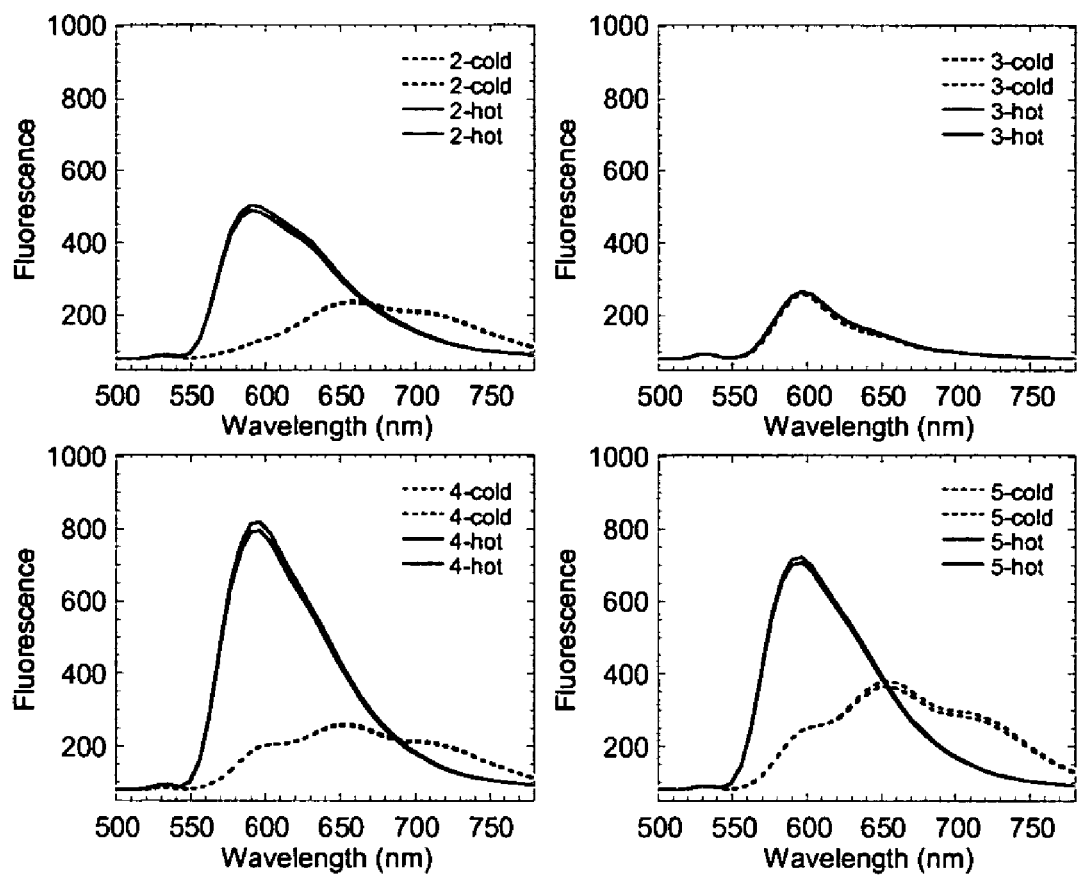
FIG. 2 is a fluorescence emission profile of samples MWB0703031-2 to -5 at an excitation wavelength of 532 nm at room temperature (cold) and when heated at about 100° C. (hot).

FIG. 2 depicts the differences between fluorescence spectra of polymeric articles prepared in Example 1 and measured when the articles were at room temperature (cold) and at 100° C. (hot) as per the experimental set up of FIG. 1. FIG. 2 shows the fluorescence emission profile of samples MWB0703031-2 to -5 at an excitation wavelength of 532 nm at room temperature (cold) and when heated at about 100° C. (hot). Sample MWB0703031-2, which contains only the thermochromic tag (0.05 pph of P3ODT), shows a significant change in its fluorescence spectrum when the sample temperature is raised to about 100° C. The fluorescence emission is not only increased but the peak location shifts from about 650 nm to about 590 nm. Sample MWB0703031-3, which contains only an organic fluorophore (1 ppm of BASF Lumogen F-300) shows no change in its fluorescence emission characteristics between "cold" and "hot" state. In comparison, when the same organic fluorophone is added as an amplification compound in combination with the thermochromic compound (case of samples MWB0703031-4 and MWB0703031-5) the fluorescence emission spectrum changes significantly between the first temperature and the authentication temperature, i.e., the cold and hot states. The emission in the "hot" state at the authentication temperature exhibits a more defined peak (i.e. more intense and less broad) with a maximum at about 590 nm compared to sample MWB0703031-2 (thermochromic compound alone). This illustrates the synergistic effect between the fluorophore and the thermochromic compound. Note that the fact that the difference in fluorescence emission during the identification process is largely unaffected by the presence of the NIR absorber is significant. As a result, the NIR absorber and more specifically its absorption characteristics can be used to create an internal heat pulse induced by an external NIR light source such as a laser.

Example 3

Figure 3:
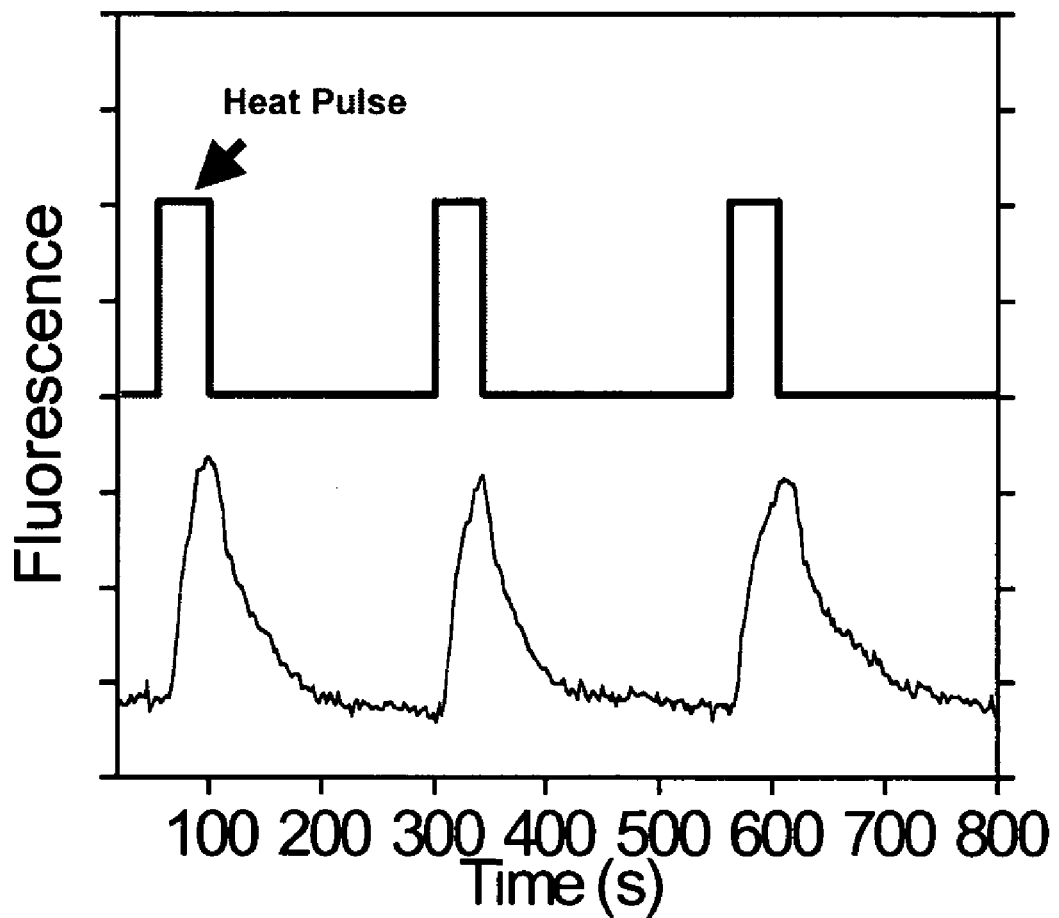
FIG. 3 is an illustration of the reversibility of the detection.

FIG. 3 demonstrates the reversibility of the fluorescence intensity increase upon heating of material MWB0707031-4 as prepared in Example 1. Sample MWB0703031-4 was exposed to consecutive short heat pulses from a heat gun while dynamic fluorescence measurements were taken.

This example illustrates that the disclosed methods provide a more robust identification method that can be performed many times. This feature is of particular interest in anti-piracy where articles could be checked at various stages during production, shipping, and distribution or even in court to prove or disprove the authenticity of a product.

Example 4

Figure 4:
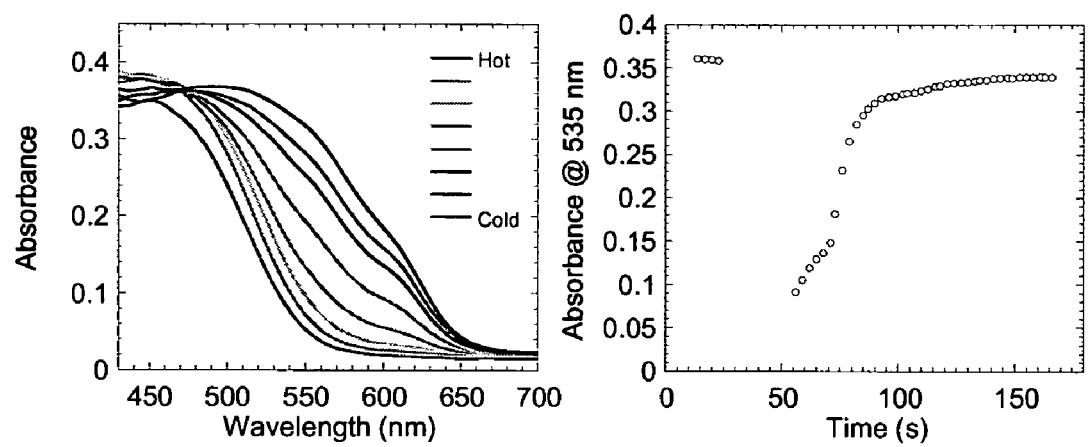
FIG. 4 is an illustration of the thermochromic behavior of sample MWB0703031-4.

FIG. 4 presents the changes in absorption characteristics measured during heating of sample MWB0703031-4 as prepared in Example 1. The first graph of FIG. 4 (left) shows the changes in the absorption spectrum when the temperature is raised from "cold" to "hot". The second graph (right) of FIG. 4 presents the absorbance change at 535 nm.

Figure 5:
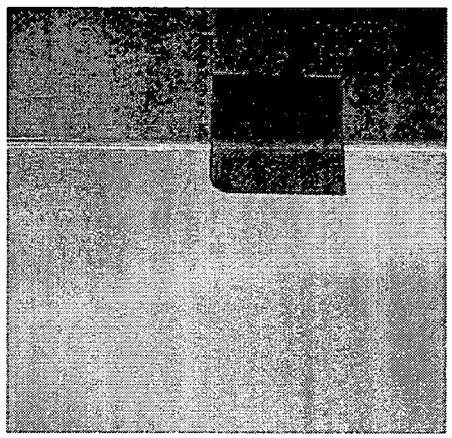
FIG. 5 is an illustration of the visual color change due to the thermochromic pigment.
Figure 5:
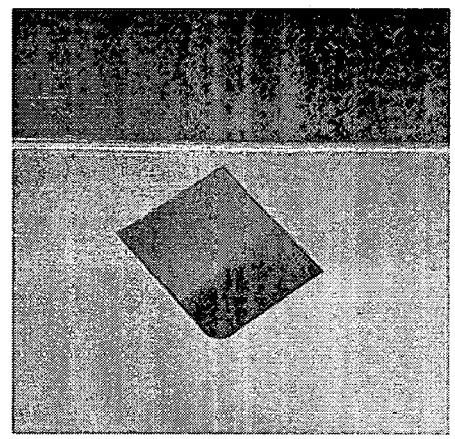

It must be noted that the absorbance at 535 nm (which is almost identical to the absorbance at 532 nm, the excitation wavelength of the laser) decreases from by almost 75% going from about 0.35 to about 0.08 when the samples go from a "cold" to a "hot" state. Such change creates a variable excitation of the fluorophore tag present at a very low level in the article. As a result, the combination of thermochromic pigment and fluorophore exhibits a strong increase in fluorescence signal. The changes observed in the absorption spectrum during the thermochromic transition are consistent with the visual color change shown in FIG. 5 (shift from red to yellow as the temperature is raised above the thermochromic transition).

Example 5

Figure 6:
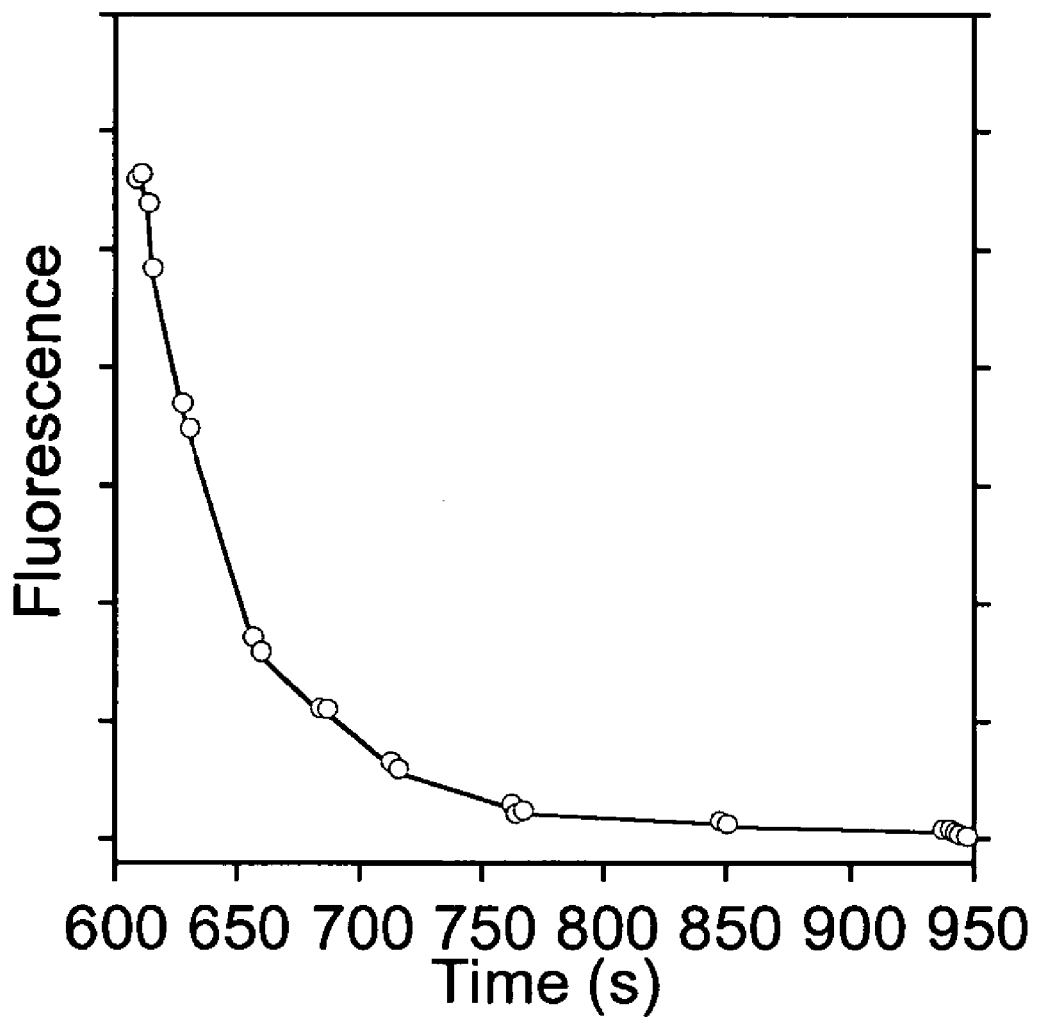
FIG. 6 is a graphical representation of the fluorescence decay of sample MWB0703031-4 as a function of time after heating.

FIG. 6 illustrates the changes in the fluorescence emission after a heat pulse. The fluorescence decay of sample MWB0703031-4 as prepared in Example 1 is shown as a function of time after heating. The experimental set up of Example 3 was used. This shows that it is possible to perform the identification not only via monitoring of the changes of the fluorescence emission between two sample states ("hot" and "cold") but also via analysis of a dynamic parameter such as the fluorescence decay after heating. The characteristics of such decay will typically depend on the intensity and duration of the heat pulse as well as the loading of the thermochromic material and fluorophore tag, and the nature of the polymer matrix. For this reason, using the decay characteristics during the identification process could provide a more secure authentication.

The methods and articles disclosed herein provide a method of authenticating useful in the authentication and confirmation of the source, and identify polymer-based substrates, especially polycarbonate based materials and of articles made from such substrates.

The presence of both thermochromic compounds and amplification compounds in a particular substrate or data storage media provides for a variety of options with respect to a particularly selected authentication signal for an authenticatable polymer. As a result, counterfeiters and illegitimate producers and sellers will find it more difficult to 'mimic' the authentication signal for an authenticatable polymer and articles legitimately made therefrom. Moreover, the amplification compounds will be difficult to detect with UV-Visible spectroscopy since their absorption is generally hidden behind the absorption of the thermochromic pigment. By using both a 'hidden' amplification compounds and a thermochromic compound whose signals vary with temperature, counterfeiters and illegitimate producers and sellers may be more readily identified and apprehended.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method of authenticating that a test polymer is an authenticatable polymer, wherein the authenticatable polymer comprises a substrate polymer and a thermochromic compound, the thermochromic compound having a first signal at a first temperature and at an authenticating wavelength, and a second signal at an authenticating temperature and the authenticating wavelength, the first and second signals being different, and the authenticating temperature being greater than the first temperature, the method comprising
subjecting the test polymer to a stimulus sufficient to raise a portion of the test polymer to the authenticating temperature to create a heated portion,
determining a test signal of the heated portion of the test polymer at the authenticating wavelength, and
authenticating that the test polymer is an authenticatable polymer if the test signal is substantially the same as an authenticating signal of the authenticatable polymer.

2. The method of claim 1 wherein the step of determining the test signal further comprises measuring at least one of reflection, emission, fluorescence, or luminescence.

3. The method of claim 2 wherein the step of determining the test signal further comprises using an analytical technique that is at least one of fluorescence spectroscopy, luminescence spectroscopy, vibrational spectroscopy, or electronic spectroscopy.

4. The method of claim 3 wherein the step of determining the test signal further comprises using an analytical technique that is at least one of fluorescence spectroscopy or luminescence spectroscopy.

5. The method of claim 1 wherein the thermochromic compound is present in the authenticatable polymer in an amount of no more than or equal to about 10 weight percent, based on the authenticatable polymer.

6. The method of claim 5 wherein the thermochromic compound is present in the authenticatable polymer in an amount of less than or equal to about 5 weight percent, based on the authenticatable polymer.

7. The method of claim 6 wherein the thermochromic compound is present in the authenticatable polymer in an amount of less than or equal to about 1 weight percent, based on the authenticatable polymer.

8. The method of claim 7 wherein the thermochromic compound is present in the authenticatable polymer in an amount of at least 0.005 weight percent, based on the authenticatable polymer.

9. The method of claim 1 wherein the thermochromic compound is present in the authenticatable polymer in an amount that does not provide a visually retrievable thermochromic response.

10. The method of claim 1 wherein the substrate polymer is polycarbonate.

11. The method of claim 1 wherein the authenticating wavelength is at least one of an excitation wavelength, a maximum excitation wavelength, or a range of excitation wavelengths.

12. The method of claim 11 wherein the authenticating wavelength is an excitation wavelength of from 250 nm to 800 nm.

13. The method of claim 11 wherein the test signal is a least one of intensity of fluorescence, shape of a fluorescence peak, location of a fluorescence peak, duration or decay of fluorescence over time or after removal of a heat source, the ratio of fluorescence intensity at at least two different wavelengths, and combinations thereof.

14. The method of claim 1 wherein the stimulus is a direct stimulus.

15. The method of claim 14 wherein the stimulus is a heat source that transfers thermal energy via a heated fluid.

16. The method of claim 1 wherein the stimulus is an indirect stimulus.

17. The method of claim 16 wherein the stimulus comprises a source of electromagnetic radiation.

18. The method of claim 17 wherein the authenticatable polymer further comprises a component that absorbs electromagnetic radiation and converts it to heat.

19. The method of claim 18 wherein the authenticatable polymer comprises a NIR absorber.

20. The method of claim 1 wherein the authenticatable polymer further comprises an amplification compound, and wherein an authenticating signal of the authenticatable polymer is greater than the second signal of the thermochromic compound as a result of the amplification compound.

21. The method of claim 20 wherein the amplification compound is at least one of an organic fluorophore, an inorganic fluorophore, an organometallic fluorophore, or a luminescent nanoparticle.

22. The method of claim 20 wherein the amplification compound is present in the authenticatable polymer in an amount of about $10^{-18}$ to about 2 weight percent, based on the weight of the authenticatable polymer.

23. An authenticatable polymer, comprising:
a substrate polymer;
a thermochromic compound having a first signal at a first temperature and at an authenticating wavelength, and a second signal at an authenticating temperature and the authenticating wavelength, the first and second signals being different, and the authenticating temperature being greater than the first temperature, and
an amplification compound, wherein an authenticating signal of the authenticatable polymer is greater than the second signal of the thermochromic compound as a result of the amplification compound;
wherein the thermochromic compound is present in the authenticatable polymer in an amount of 0.001 to 0.50 weight percent, based on the weight of the authenticatable polymer.

24. The authenticatable polymer of claim 23 wherein the thermochromic compound is present in an amount of less than 0.50 weight percent, based on the weight of the authenticatable polymer.

25. The authenticatable polymer of claim 23 wherein the thermochromic compound is present in an amount of about 0.005 to about 0.50 weight percent, based on the weight of the authenticatable polymer.

26. The authenticatable polymer of claim 23 wherein the amplification compound is at least one of an organic fluorophore, an inorganic fluorophore, an organometallic fluorophore, or a luminescent nanoparticle.

27. The authenticatable polymer of claim 23 wherein the amplification compound is present in the authenticatable polymer in an amount of about $10^{-18}$ to about 2 weight percent, based on the weight of the authenticatable polymer.

28. A method of making an authenticatable polymer, comprising:
    incorporating together a polymer and a thermochromic compound to provide an authenticatable polymer, wherein the thermochromic compound is incorporated in an amount of 0.00 1 to 0.50 weight percent, based on the weight of the authenticatable polymer; and
    forming an optical disk substrate from the authenticatable polymer.

29. The method of claim 28 wherein forming the article from the authenticatable polymer comprises melting the authenticatable polymer.

30. The method of claim 29 further comprising extruding or molding the authenticatable polymer.

31. The method of claim 30 wherein said molding comprises injection molding the authenticatable polymer.

32. An optical disk made from the method of claim 28, wherein the optical disk further comprises a reflective layer.

33. The optical disk substrate of claim 28 wherein the substrate made from the authenticatable polymer is a read through substrate.

34. The optical disk substrate of claim 28 having two substrates made from the authenticatable polymer.

* * * * *